United States Patent
Kim et al.

(10) Patent No.: US 10,438,390 B2
(45) Date of Patent: Oct. 8, 2019

(54) VEHICLE CONTROL DEVICE MOUNTED ON VEHICLE AND METHOD OF CONTROLLING THE VEHICLE

(71) Applicant: LG ELECTRONICS INC., Seoul (KR)

(72) Inventors: Yeonsoo Kim, Seoul (KR); Dukyung Jung, Seoul (KR); Ilwan Kim, Seoul (KR); Sunghwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/875,844

(22) Filed: Jan. 19, 2018

(65) Prior Publication Data
US 2019/0180485 A1    Jun. 13, 2019

(30) Foreign Application Priority Data
Dec. 12, 2017 (KR) .................. 10-2017-0170666

(51) Int. Cl.
| | |
|---|---|
| *G06T 11/60* | (2006.01) |
| *G08G 1/14* | (2006.01) |
| *G06K 9/00* | (2006.01) |
| *G06T 11/00* | (2006.01) |
| *G02B 27/01* | (2006.01) |
| *B60R 1/00* | (2006.01) |

(Continued)

(52) U.S. Cl.
CPC .............. *G06T 11/60* (2013.01); *B60K 35/00* (2013.01); *B60R 1/00* (2013.01); *G01C 21/3602* (2013.01); *G01C 21/365* (2013.01); *G02B 27/0101* (2013.01); *G05D 1/0246* (2013.01); *G06K 9/00671* (2013.01); *G06K 9/00791* (2013.01); *G06K 9/00812* (2013.01); *G06T 11/001* (2013.01); *G08G 1/143* (2013.01); *B60K 2370/21* (2019.05); *B60R 2300/105* (2013.01); *B60R 2300/30* (2013.01); *G02B 2027/014* (2013.01); *G02B 2027/0138* (2013.01); *G02B 2027/0141* (2013.01)

(58) Field of Classification Search
CPC .......... G06T 11/60; G09G 5/02; G09G 5/377; G09G 5/397; B60K 35/00; B60R 1/00; B60R 2300/105; G02B 27/01; G05D 1/0246; G06K 9/00812; G08G 1/143
See application file for complete search history.

(56) References Cited

U.S. PATENT DOCUMENTS 8,218,007 B2 * 7/2012 Lee .......................... B60R 1/00
340/932.2
2010/0253542 A1  10/2010 Seder et al.
(Continued)

FOREIGN PATENT DOCUMENTS

| JP | 2011-525621 A | 9/2011 |
|---|---|---|
| JP | 2015-194473 A | 11/2015 |

(Continued)

*Primary Examiner* — Antonio A Caschera
(74) *Attorney, Agent, or Firm* — Birch, Stewart, Kolasch & Birch, LLP

(57) ABSTRACT

A vehicle control device can include a sensing unit including a camera; a display unit; and a controller configured to receive a preset destination, receive an image captured by the camera, identify the preset destination from the image, and display, on the display unit, a graphic object superimposed on the preset destination.

19 Claims, 26 Drawing Sheets

(51) Int. Cl.
    *G05D 1/02*     (2006.01)
    *B60K 35/00*     (2006.01)
    *G01C 21/36*     (2006.01)

(56) References Cited

U.S. PATENT DOCUMENTS

| | | |
|---|---|---|
| 2011/0313653 A1 | 12/2011 | Lindner |
| 2014/0214600 A1 | 7/2014 | Argue et al. |
| 2014/0362195 A1 | 12/2014 | Ng-Thow-Hing et al. |
| 2017/0017848 A1* | 1/2017 | Gupta .................. B60W 30/06 |
| 2017/0278305 A1* | 9/2017 | Sisbot .................. G06T 19/006 |

FOREIGN PATENT DOCUMENTS

| | | |
|---|---|---|
| JP | 2016-118851 A | 6/2016 |
| KR | 10-2014-0031466 A | 3/2014 |
| KR | 10-2015-0066036 A | 6/2015 |

\* cited by examiner

VEHICLE CONTROL DEVICE MOUNTED ON VEHICLE AND METHOD OF CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0170666, filed in the Republic of Korea on Dec. 12, 2017, the contents of which are incorporated by reference herein in its entirety.

BACKGROUND OF THE INVENTION

1. Field of the Invention

The present disclosure relates to a vehicle control device mounted on or in a vehicle and a method of controlling the vehicle.

2. Background of the Invention

A vehicle is an apparatus capable of moving a user in the user-desired direction, and a representative example may be a car.

In addition, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating by directly emitting light using lamps, such as a head lamp emitting light to a front side to ensure a driver's view, a brake lamp turned on when applying the brake, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

In addition, as the development of the advanced driving assist system (ADAS) is recently being carried out, development of a technology for optimizing user's convenience and safety while driving a vehicle is desired.

Recently, various technologies to autonomously drive a vehicle are being actively developed.

SUMMARY OF THE INVENTION

An object of the present disclosure is to provide a vehicle control device and a vehicle control method that are capable of guiding a vehicle to a destination in an optimized manner.

Another object of the present disclosure is to provide a vehicle control device and a vehicle control method that are capable of providing a user interface that allows a destination that is set by a user to be easily recognized.

Solutions to the problems, which are provided according to the present disclosure, are not limited to the solutions described above, and other solutions that are not described above can be understood by a person of ordinary skill in the art from descriptions of the claims.

According to an embodiment of the present disclosure, a vehicle control device includes a sensing unit configured to include a camera, a display unit, and a controller including a processor configured to receive an image through the camera and to output a graphic object to the display unit so the graphic object is superimposed on a preset destination, based on the preset destination being identified from the image.

In the vehicle control device according to an embodiment, the display unit can include a windshield and a glass window of a vehicle, and the processor outputs the graphic object on the windshield or the glass window.

In the vehicle control device according to an embodiment, the processor can output the graphic object on the windshield or the glass window so the graphic object is superimposed on the destination when a driver takes a look at the destination.

In the vehicle control device according to an embodiment, the processor can cause an output position and a shape of the graphic object to be variable, based on a location and a shape of the destination changing based on a driver's view of the destination while traveling'.

In the vehicle control device according to an embodiment, when the destination is included in a building, the processor can output a graphic object corresponding to a peripheral edge of the building, so the graphic object is superimposed on the building.

In the vehicle control device according to an embodiment, when the destination is a vacant lot or a parking lot, the processor can output a wall-shaped graphic object so the wall-shaped graphic object is superimposed on the vacant lot, in order to identify a border of the vacant lot.

In the vehicle control device according to an embodiment, based on whether or not the building including the destination is identified from the image that is received through the camera, and whether or not the building including the destination is fully included in the image, the processor can output the graphic object to the display unit in different ways.

In the vehicle control device according to an embodiment, the processor can output a first graphic object including information relating to the destination to the display unit, when the building including the destination is not identified from the image, and may output a second graphic object that is formed to correspond to the peripheral edge of the building, to the display unit, along with the first graphic object, when the building including the destination is identified from the image.

In the vehicle control device according to an embodiment, when the building including the destination is identified from the image, but only a portion of the building is included in the image, the processor can output a third graphic object to the display unit so the third graphic object is superimposed on a portion of the building, in which the destination is positioned.

In the vehicle control device according to an embodiment, based on a distance between a vehicle and the destination, the processor can output a graphic object relating to a parking lot in the destination, in a preset way to the display unit.

In the vehicle control device according to an embodiment, the processor can output a graphic object relating to the parking lot in a first way to the first display unit, when the distance between the building including the destination and the vehicle is a first distance, and may output the graphic object relating to the parking lot, in a second way that is different from the first way, to the display unit, when the distance between the building including the destination and the vehicle is a second distance that is shorter than the first distance.

In the vehicle control device according to an embodiment, when an entrance to the parking lot in the building including the destination is identified from the image that is received through the camera, the processor can output a graphic object so the graphic object is superimposed on the entrance to the parking lot.

In the vehicle control device according to an embodiment, when the vehicle travels into an area that is at a fixed distance from the building including the destination, the processor can output a first graphic object relating to a parking lot in the building including the destination and a second object relating to another parking lot that is present within a fixed distance from the parking lot in the building, to the display unit, so the first and second graphic objects are superimposed on a road on which the vehicle is traveling.

In the vehicle control device according to an embodiment, when the parking lot in the destination is full, the processor can output a graphic object of a first color so the graphic object of the first color is superimposed on a building including the destination, and may output a graphic object of a second color that is different from the first color, so the graphic object of the second color is superimposed on a building in which parking is available and which is positioned within a fixed distance from the destination.

In the vehicle control device according to an embodiment, the processor can output the graphic object in different shapes to the display unit based on a current traveling speed of the vehicleprocessor can.

In the vehicle control device according to an embodiment, when a parking space along a road, which is available for parking, is sensed, the processor can output a graphic object indicating that the parking space is available for parking, to the display unit, so the graphic object is superimposed on the parking space.

In the vehicle control device according to an embodiment, when a vehicle enters an intersection in a state where the destination is not identified from the image, the processor can output time information for the time it takes the vehicle to travel to the destination along each road, to the display unit, so the time information is superimposed on each road.

In the vehicle control device according to an embodiment, when the preset destination is identified from the image, the processor can output a plurality of graphic objects that indicate a plurality of destinations, respectively, that are included in the same category as the destination, to the display unit, and, when any one graphic object is selected from among the plurality of graphic objects, may display the selected graphic object so the selected graphic object is superimposed on a destination that corresponds to the selected graphic object.

According to another embodiment of the present disclosure, the vehicle control device is included in a vehicle.

According to still another embodiment of the present disclosure, there is provided a vehicle control method including receiving an image through a camera, and outputting a graphic object to a display unit so the graphic object is superimposed on a preset destination, based on the preset destination being identified from the image.

Specific details of other embodiments are included in the following detailed description and the accompanying drawings.

According to the embodiments of the present disclosure, there are one or more effects that follow.

First, according to the present disclosure, there are provided a vehicle control apparatus and a vehicle control method that are capable of outputting a graphic object so the graphic object is superimposed on a destination on a windshield, and thus enabling a driver to intuitively recognize the destination when the destination is within a driver's field of view.

Second, according to the present disclosure, there is provided a new user interface through which an optimized user interface relating to a destination and a parking lot in the destination is output in an augmented reality head up display AR-HUD way.

Third, according to the present disclosure, there is provided a vehicle control apparatus and a vehicle control method capable of intuitively providing information on a path that is formed for possible traveling to a destination, through a windshield, although the destination is not included in a driver's field of view.

Effects according to the present disclosure are not limited to the effects described above, and other effects that are not described above can be understood by a person of ordinary skill in the art from descriptions of the claims.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
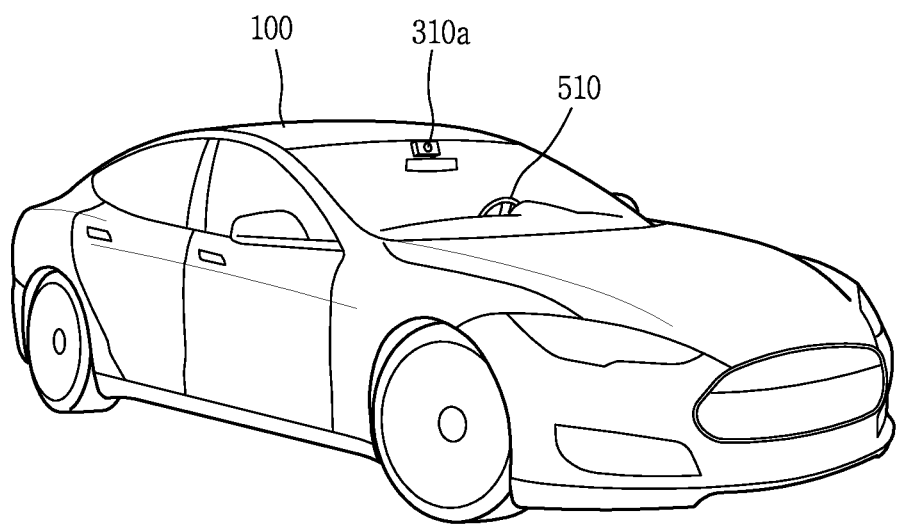
FIG. 1 is a diagram illustrating an appearance of a vehicle according to an embodiment of the present disclosure.
Figure 1:
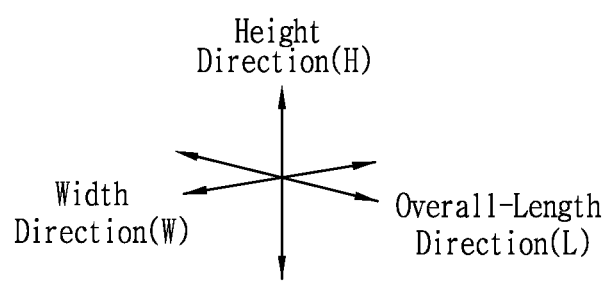

FIG. 1 is a view illustrating an appearance of a vehicle in accordance with an embodiment of the present invention.

Figure 2:
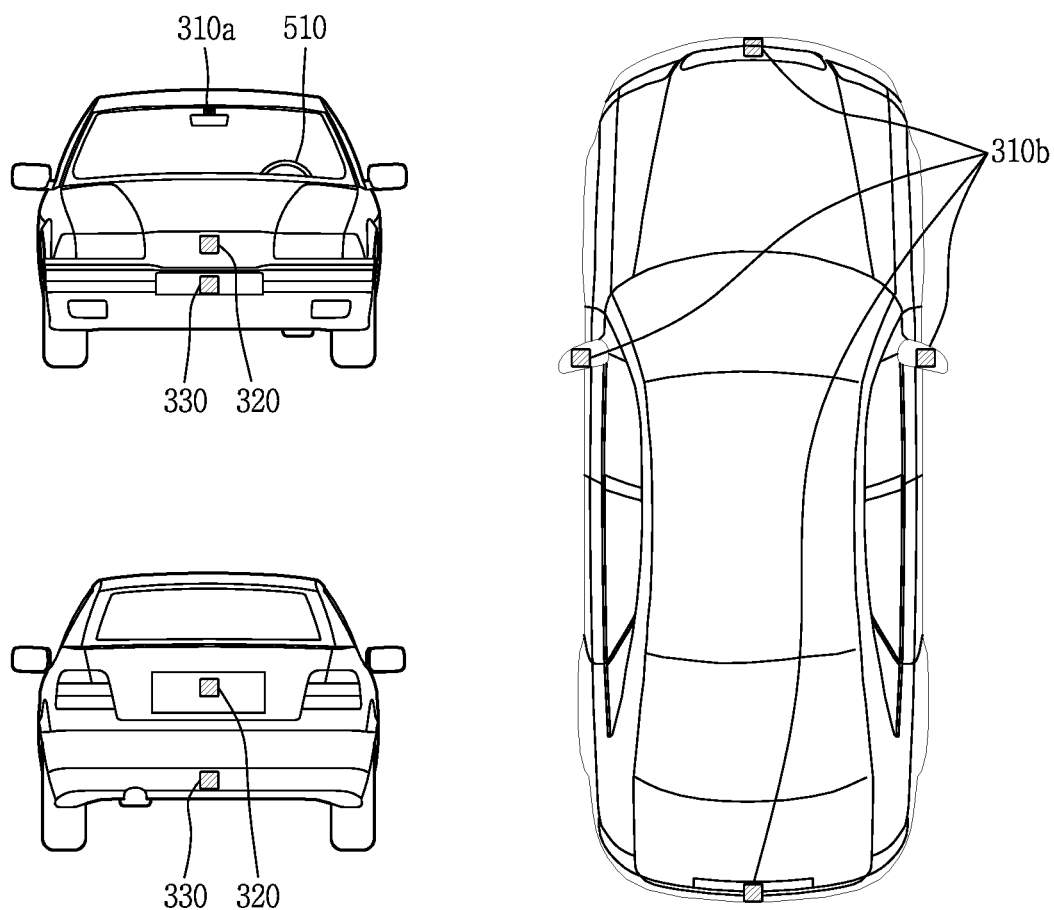
FIG. 2 is a diagram illustrating a vehicle according to an embodiment of the present disclosure, when viewed from various angles.

FIG. 2 is a view illustrating an appearance of a vehicle at various angles in accordance with an embodiment of the present invention.

Figure 3:
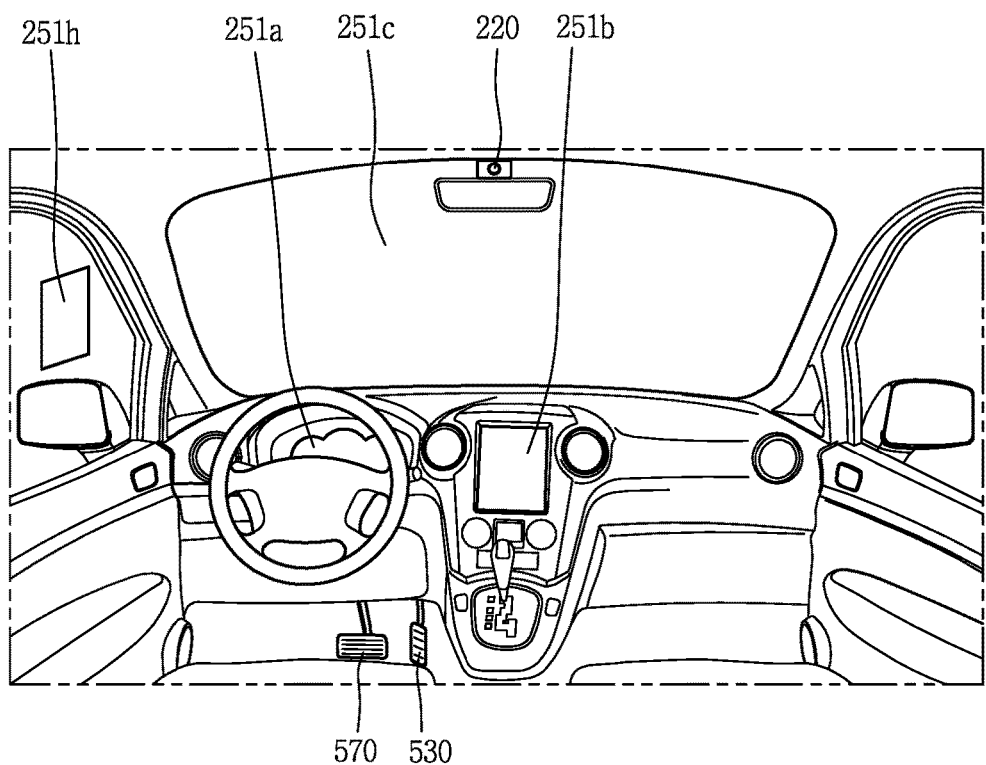
FIGS. 3 and 4 are diagrams illustrating the inside of a vehicle according to an embodiment of the disclosure.
Figure 4:
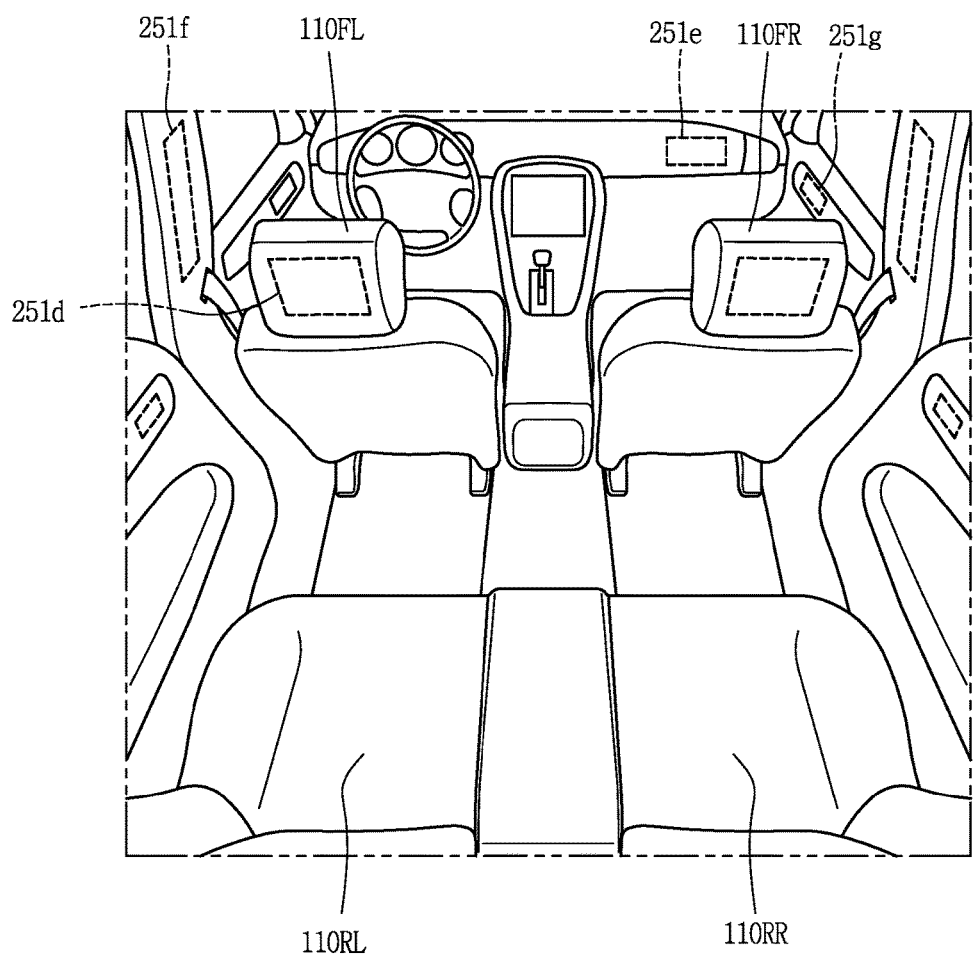

FIGS. 3 and 4 are views illustrating an inside of a vehicle in accordance with an embodiment of the present invention.

Figure 5:
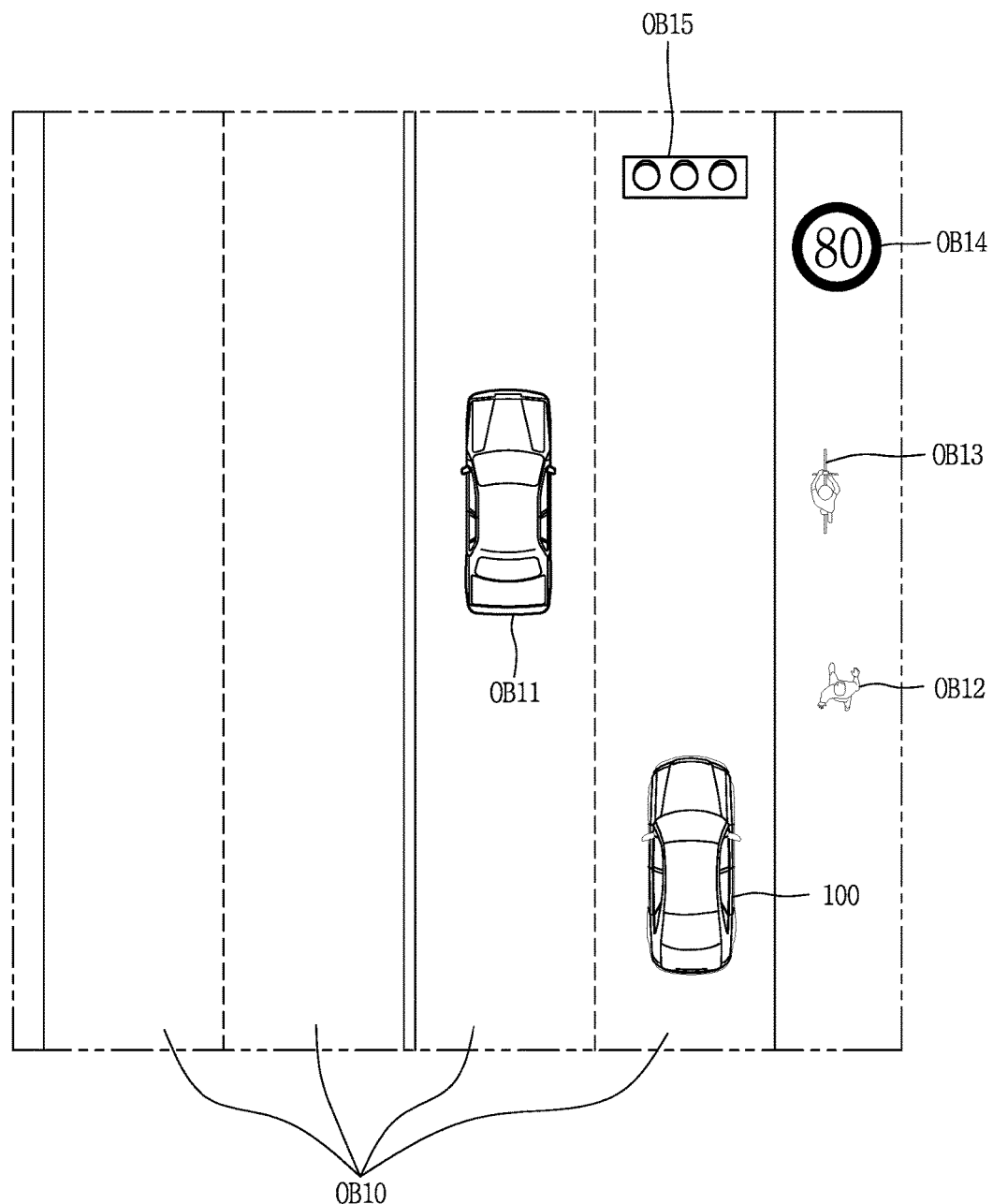
FIGS. 5 and 6 are diagrams that are referred to illustrating an object according to an embodiment of the present disclosure.
Figure 6:
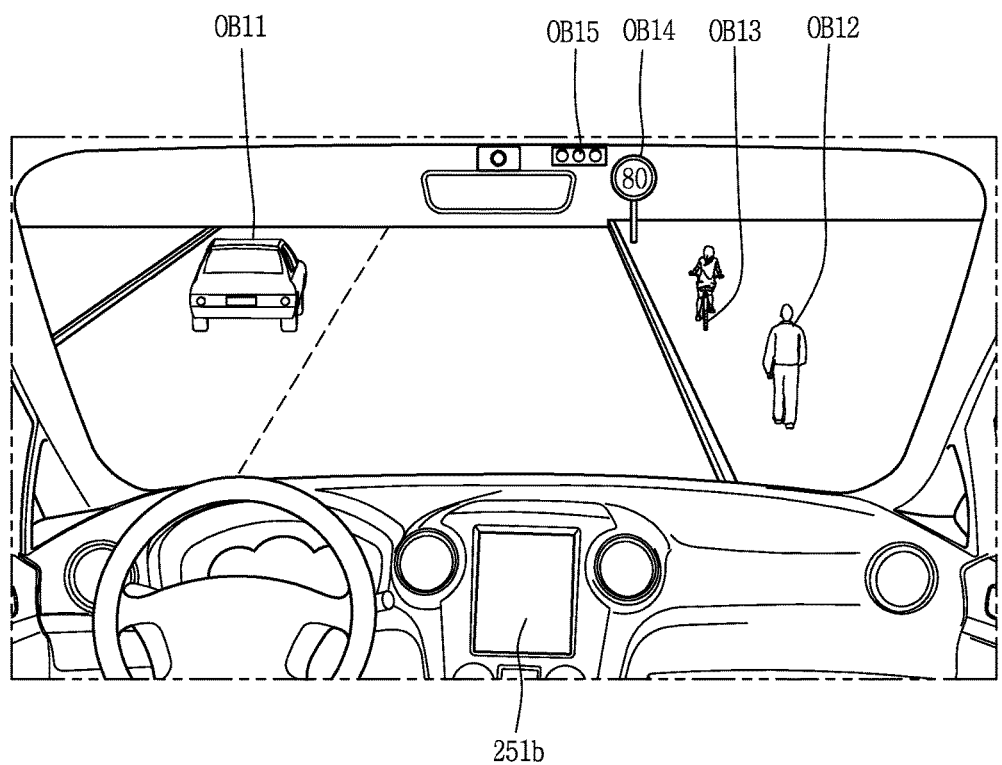

FIGS. 5 and 6 are reference views illustrating objects in accordance with an embodiment of the present invention.

Figure 7:
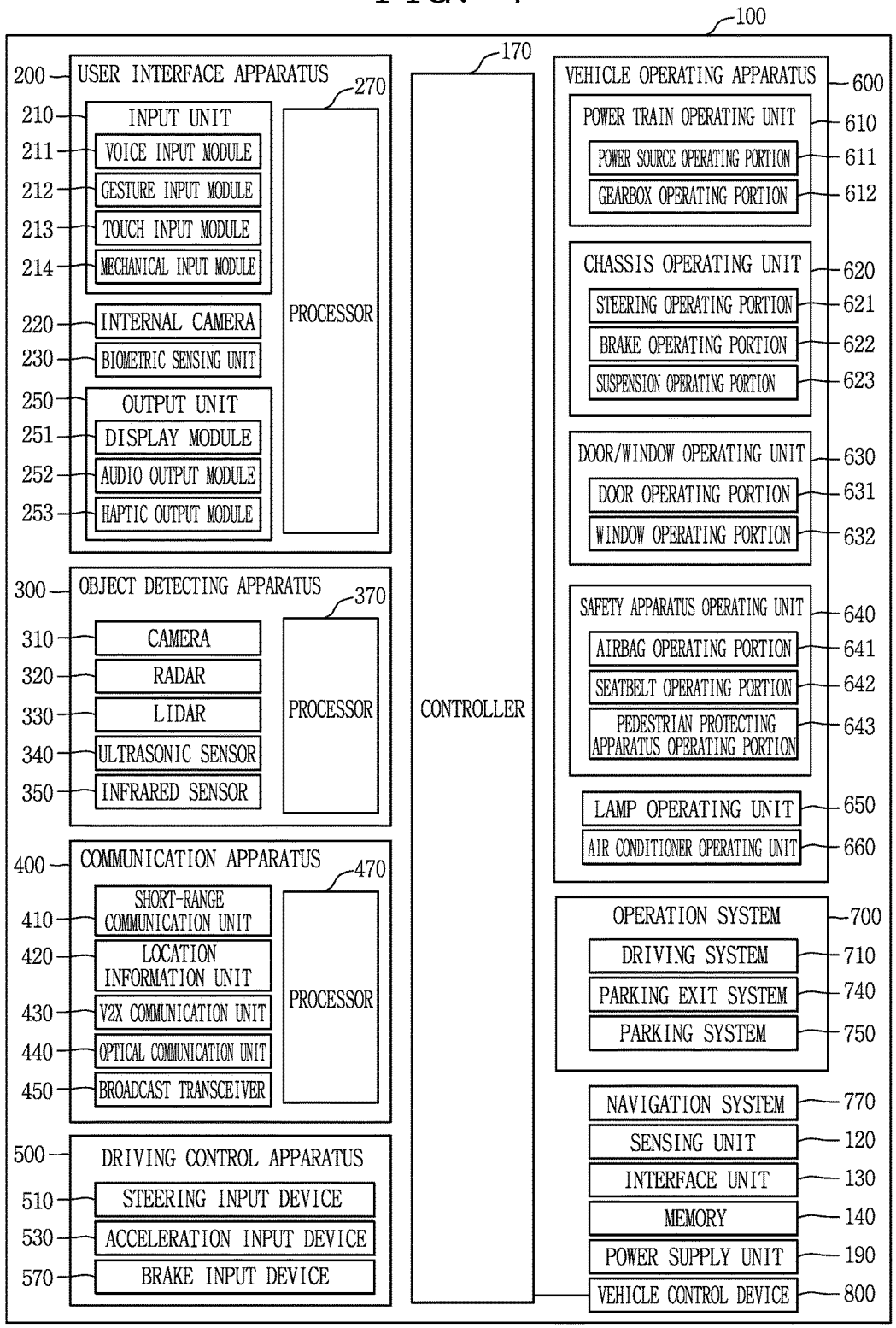
FIG. 7 is a block diagram that is referred to illustrating a vehicle according to the embodiment of the present disclosure.

FIG. 7 is a block diagram illustrating a vehicle in accordance with an embodiment of the present invention As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. Thus, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In addition, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. Thus, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In addition, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed bump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves in front or behind the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In addition, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor can detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In addition, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

In addition, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In addition, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In addition, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In addition, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

In addition, the operation system 700 may include a processor. Each unit of the operation system 700 may individually include a processor.

According to embodiments, the operation system may be a sub concept of the controller 170 when it is implemented in a software configuration.

In addition, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor can control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In addition, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In addition, the vehicle 100 according to an embodiment of the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Constituent elements that are included in a vehicle control device 800 according to an embodiment of the present disclosure will be described in more detail below with respect to the accompanying drawings.

Figure 8:
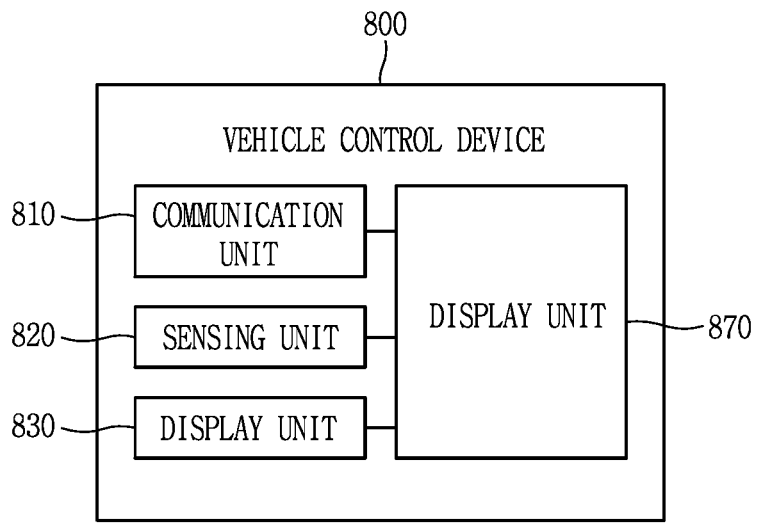
FIG. 8 is a conceptual diagram illustrating a vehicle control device according to an embodiment of the present disclosure.

FIG. 8 is a conceptual diagram illustrating describing a vehicle control device according to the embodiment of the present disclosure.

The vehicle control device 800 according to embodiments of the present disclosure includes a communication unit 810, a sensing unit 820, the display unit 830, a processor 870, and so forth.

First, the vehicle control device 800 according to embodiments of the present disclosure includes the communication unit 810.

The communication unit 810 may be the communication apparatus 400 described above. The communication unit 810 is connected to a mobile terminal that is present within a vehicle 100 so communication with the mobile terminal is possible.

As an example, the vehicle control device 800 (or the vehicle 100) and the mobile terminal are connected to each other through the communication unit 810 so wireless communication between them is possible. The vehicle control device 800 and the mobile terminal are wirelessly connected to each other according to a user's request so wireless communication between them is possible. Alternatively, if the vehicle control device 800 and the mobile terminal have been previously connected to each other in a wireless manner, when a user who carries the mobile terminal with him/her rides in the vehicle, the vehicle control device 800 and the mobile terminal are wirelessly connected to each other so the wireless communication between them is possible.

The communication unit 810 may be provided within the vehicle (or within a vehicle control device), or may be separately provided in the form of a module in such a manner as to possibly communicate with (or make a connection to) components of the vehicle.

The vehicle control device 800 controls a mobile terminal 900 through the communication unit 810.

Specifically, the vehicle control device 800 transmits a control signal for controlling a mobile terminal 900, to the mobile terminal 900 through the communication unit 810. When receiving the control signal, the mobile terminal 900 performs a function, an operation, or control that corresponds to the control signal.

According to an embodiment of the present disclosure, in the reverse direction, the mobile terminal 900 possibly controls the vehicle control device 800 (or the vehicle 100). Specifically, the mobile terminal 900 transmits a control signal for controlling the vehicle to the vehicle control device 800. In response, the vehicle control device 800 performs a function, an operation, or control that corresponds to the control signal that is transmitted from the mobile terminal 900.

In addition, the communication unit 810 performs communication with an external apparatus (for example, a server, a cloud server (or client), the Internet, or the like) that is present outside of the vehicle. In addition, the communication unit 810 performs the communication with another vehicle.

The communication unit 810 receives information relating to a destination from the external apparatus. Pieces of information relating to the destination can include an image that is obtained by image-capturing the destination, a location of the destination, a type of the destination, information relating to a building (for example, a structure of the building and information on shops on each floor of the building) when the destination is within the building, and information relating to a parking lot in or corresponding to the destination.

In addition, the communication unit 810 may include various pieces of information, such as information relating to a building that is present within a fixed distance from the vehicle, information relating to a vacant lot, and information relating to a parking lot, from the external apparatus.

Reception of these pieces of information is performed under the control of the processor 870 or is performed under the control of the external apparatus.

The vehicle control device 800 includes the sensing unit 820. The sensing unit 820 may be the object detecting apparatus 300 that is described above with reference to FIG. 7, and may be the sensing unit 120 that is provided in the vehicle 100.

The sensing unit 120 includes a camera. An example of the camera includes an internal camera that is provided to image-capture the inside of the vehicle and an external camera that is provided to image-capture what is viewed outward from the vehicle.

The sensing unit 120 senses a detection of driver's gaze using the internal camera.

In addition, the sensing unit 120 image-captures what is viewed outward from the vehicle, using the external camera.

An example of the sensing unit 820 may be realized as a combination of at least two of the following: the camera 310, the radar 320, the lidar 330, the ultrasonic sensor 340, the infrared sensor 350, and the sensing unit 120 that are included in the object detecting apparatus 300.

The sensing unit 820 senses information relating to the vehicle 100 according to an embodiment of the present disclosure.

The information relating to the vehicle is at least one of vehicle information (or a vehicle-traveling state) and information relating to the vicinity of the vehicle.

For example, pieces of information relating to the vehicle include a traveling speed of the vehicle, a weight of the vehicle, the number of people on board, braking power of the vehicle, maximum braking power of the vehicle, a traveling mode (an autonomous traveling mode or a manual traveling mode) of the vehicle, a parking mode (an autonomous parking mode, an automatic parking mode, or a manual parking mode) of the vehicle, information as to whether or not a user rides in the vehicle, and information relating to the user (for example, information as to whether or not the user is an authenticated user).

For example, pieces of information relating to the vicinity of the vehicle include a state (a frictional force) of a road on which the vehicle is traveling, weather, a distance to a preceding (or following) vehicle, a relative speed of the preceding (or following) vehicle, a curvature of a curve when a lane on which the vehicle is traveling is curved, the brightness of an area in the vicinity of the vehicle, information relating to an object that is present within a reference area (fixed area) from the vehicle, information as to whether an object moves into or out of the fixed area, information as to whether a user is present in the vicinity of the vehicle, and information relating to the user (for example, information as to whether or not the user is an authenticated user).

In addition, pieces of information relating to the vicinity of the vehicle (or environmental information relating to the vicinity of the vehicle) include information (for example, ambient brightness, ambient temperature, a sun position, information relating to an object (a person, another vehicle, a road sign, or the like) in the vicinity of the vehicle, a type of road on which the vehicle is traveling, a geographic feature, information relating to lines marked on a road on which the vehicle travels, and vehicle-traveling lane information) relating to a surrounding environment of the vehicle, and information necessary for an autonomous traveling, autonomous parking, automatic parking, or manual parking mode.

In addition, pieces of information relating to the vicinity of the vehicle further include a distance from the vehicle 100 to an object present in the vicinity of the vehicle 100, a type of the object, a parking space that is available for parking the vehicle, an object (for example, a marked parking line, a parked vehicle, a string indicating the parking space, a wall, or the like) for identifying the parking space.

In addition, pieces of information relating to the vehicle include information as to whether or not the mobile terminal is placed on a stand that is provided within the vehicle, information as to whether a user who carries the mobile terminal with him/her rides in the vehicle (or whether the mobile terminal is present within the vehicle), and information as to whether the mobile terminal and the vehicle control device are connected to each other for communication.

Pieces of information relating to a vehicle that is sensed through the sensing unit 820 are used in the autonomous traveling mode for vehicle's autonomous traveling. Specifically, the processor 870 causes the vehicle to travel autonomously, using the information relating to the vehicle that is sensed through the sensing unit 820.

In addition, the vehicle control device 800 according to an embodiment of the present disclosure includes the display unit 830.

The display unit 830 that is included in the vehicle control device 800 according to an embodiment of the present disclosure is a display device that is provided within the vehicle 100, and may be the display module 251 described above.

The display unit 830 may be the output unit 250 or the display module 251 that are described with reference to FIG. 7. In addition, the display unit 830 includes an output unit (for example, a touch screen) of the mobile terminal that possibly communicates with the communication apparatus 400.

In addition, the display unit 830 includes a transparent display. The transparent display is attached to a windshield or a window. That is, the display unit 830 according to the display unit 830 includes the windshield and the window. The outputting of any information (or a graphic object) by the processor 870 on the display unit 830 includes outputting any information (or the graphic object) on a windshield or outputting any information (or the graphic object) on the window.

In addition, the display unit 830 is positioned on an area of a steering wheel, an area 251a, 251b, or 251e of an instrument panel, an area 251d of a seat, an area 251f of each pillar, an area 251g of a door, an area of a center console, an area of a head lining, or an area of a sun visor, or is realized on an area 251c of the windshield or an area 251h of the window.

For example, the display units 830 include a cluster, a center information display (CID), a navigation device, and a head-up display.

The display unit 830 and a touch sensor are structured in layers or are integrally formed into one piece, and thus, the touch screen is realized. The touch screen functions as the input unit 210 that provides an input interface between the vehicle 100 (or the vehicle control device 800) and the user. At the same time, the touch screen provides an output interface between the vehicle 100 (or the vehicle control device 800) and the user.

The processor 870 outputs various pieces of information relating to the vehicle to the display unit 830. In addition, according to types of pieces of information relating to the vehicle, the processor 870 outputs pieces of information relating to the vehicle to different positions, respectively, on the display unit 830.

In addition, based on the location of the destination and the driver's gaze, the processor 870 outputs a graphic object to the display unit 830 in a preset way.

Various pieces of information that are output to the display unit 830 will be described in more detail below with reference to the accompanying drawings.

The display unit 830 may be a navigation system 770 (or a navigation device). In addition, the display unit 830 includes the navigation system 770.

That is, the display unit 830 may mean a navigation device that is provided in the vehicle 100. The navigation device may be built into the vehicle during the process of manufacturing the vehicle 100, and may be a navigation device that is installed by the user.

The display unit 830 may mean a vehicle-dedicated navigation, and may mean a navigation system independent of a navigation system that is provided by the mobile terminal 900.

A description of the display unit 830 in the present specification applies analogically to the navigation system 770, the navigation device, and the vehicle-dedicated navigation in the same or similar manner.

In addition, the vehicle control device 800 according to the present disclosure includes the processor 870 that possibly controls the communication unit 810, the sensing unit 820, the display unit 830, and so forth.

The processor 870 may be the controller 170 that is described with reference to FIG. 7.

The processor 870 controls the constituent elements that are described with reference to FIG. 7 and the constituent elements that are described with reference to FIG. 8.

In addition, the processor 870 receives an image through the camera that is included in the sensing unit 820.

In addition, based on a preset destination being identified from the image, the processor 870 outputs a graphic object to the display unit 830 so the graphic object is superimposed on the destination.

A method of providing a user interface through which the user possibly identifies a destination in an optimized manner, according to the present disclosure, will be described in more detail below with respect to the accompanying drawings.

Figure 9:
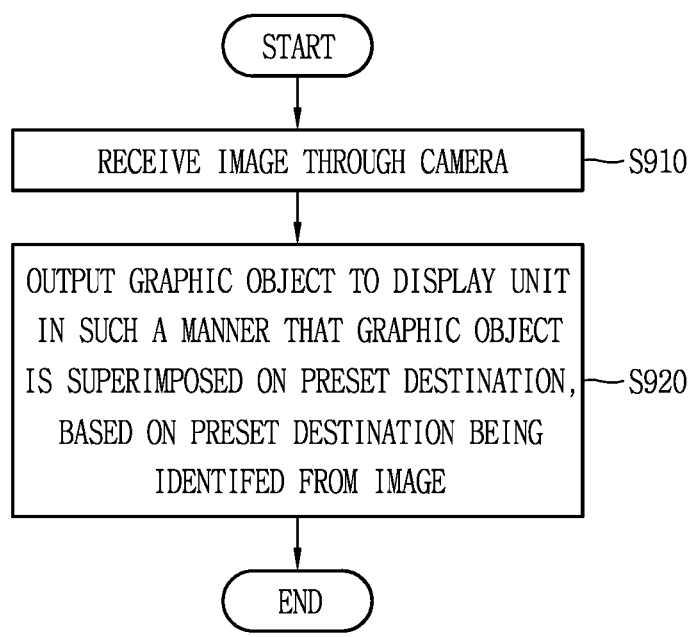
FIG. 9 is a flowchart illustrating a control method according to an embodiment of the present disclosure.
Figure 10:
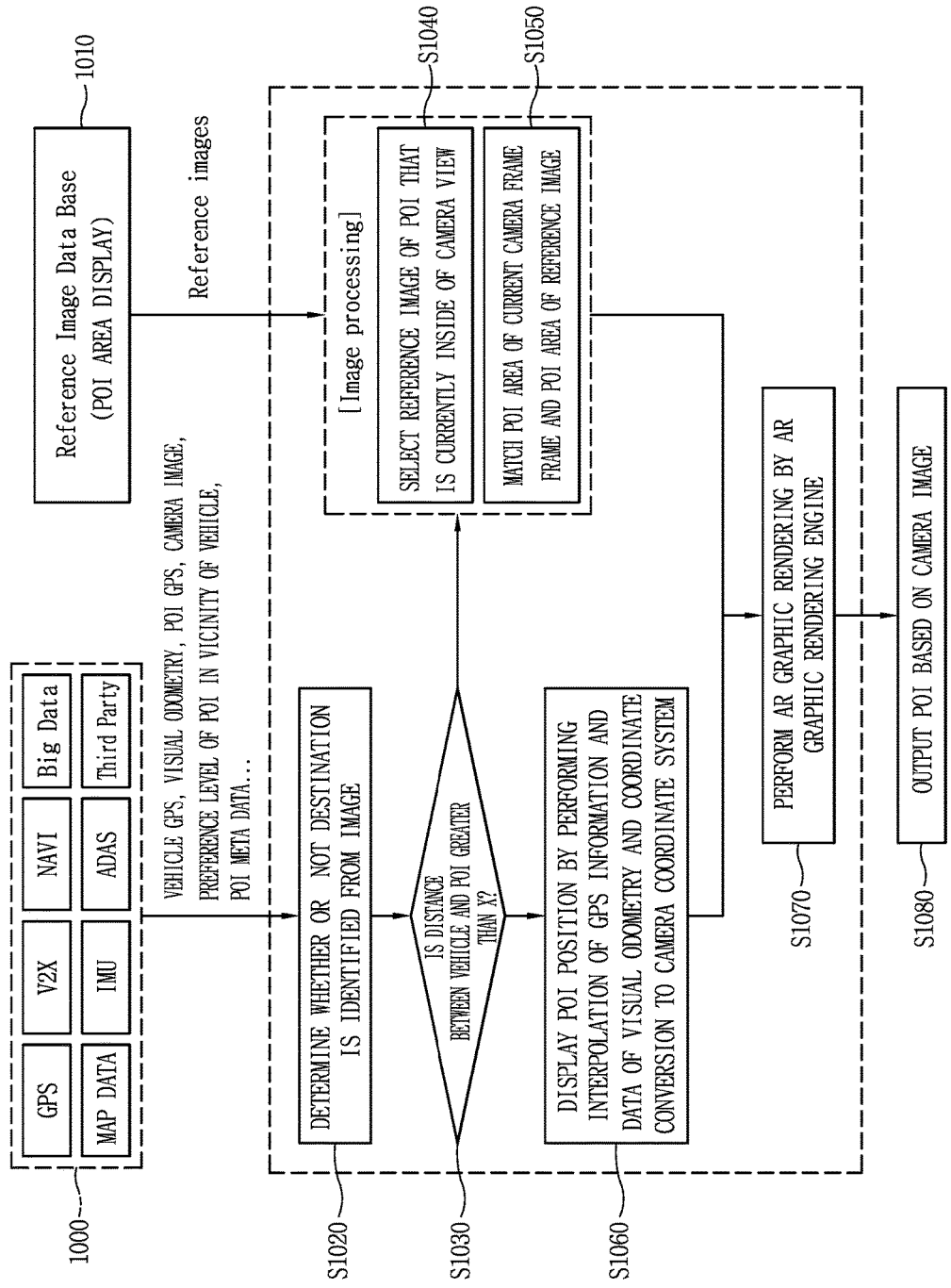
FIG. 10 is a flowchart illustrating in a control method in more detail according to an embodiment of the present disclosure.

FIG. 9 is a flowchart illustrating a control method according to an embodiment of the present disclosure. FIG. 10 is a flowchart illustrating in detail a control method according to an embodiment of the present disclosure.

Figure 11A:
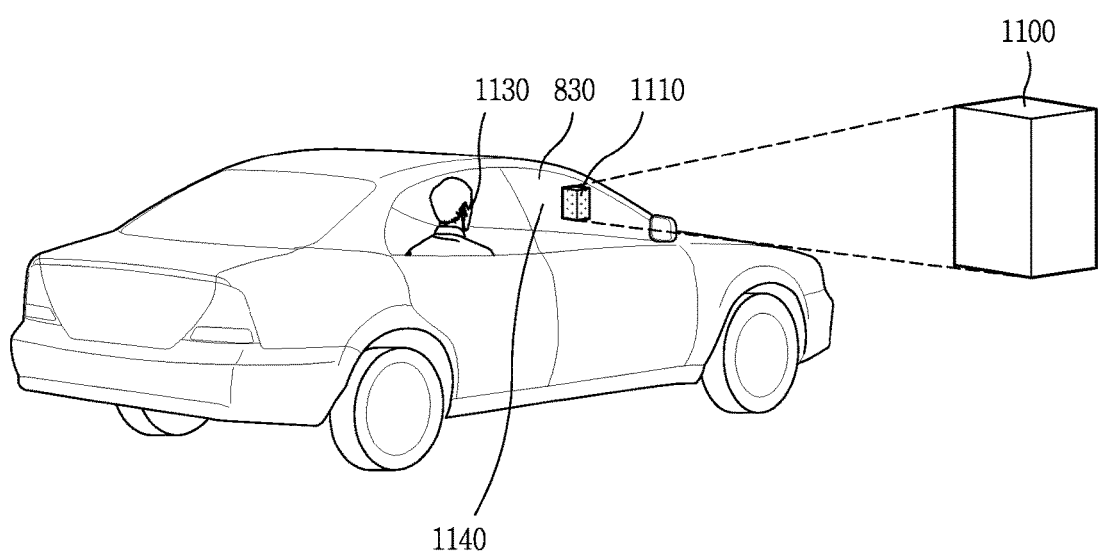
FIGS. 11A, 11B(a), 11B(b), 12A, 12B, 13A, 13B, 14A, 14B, 14C, 15, 16A, 16B, 17, 18A, 18B, 18C, 19A, 19B, 20, 21A, 21B, 22, 23A, 23B, 23C, 23D, 24, and 25 are conceptual diagrams illustrating a control method with reference to FIGS. 9 and 10 according to embodiments of the preset disclosure.
Figure 11B:
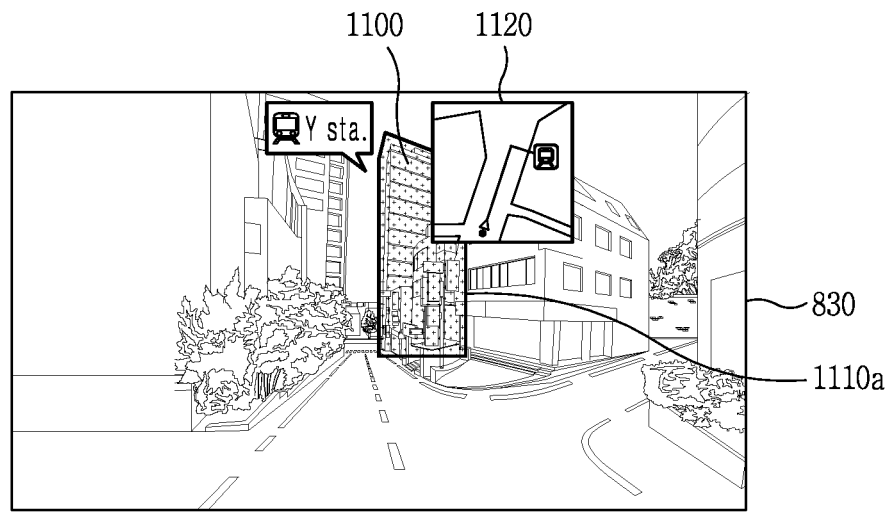
Figure 11B:
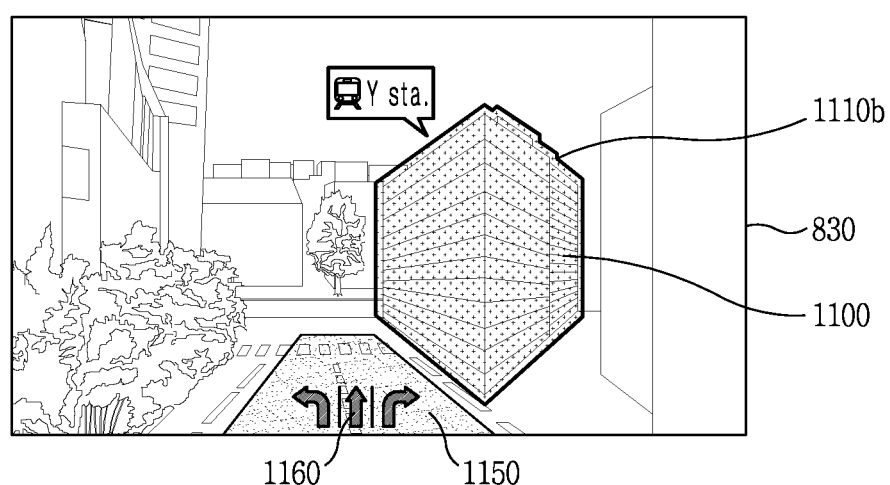

FIGS. 11A, 11B(a), 11B(b), 12A, 12B, 13A, 13B, 14A, 14B, 14C, 15, 16A, 16B, 17, 18A, 18B, 18C, 19A, 19B, 20, 21A, 21B, 22, 23A, 23B, 23C, 23D, 24, and 25 are conceptual diagrams illustrating describing the control method that are illustrated in FIGS. 9 and 10 according to embodiments.

First, with reference to FIG. 9, according to the present disclosure, a step of receiving an image through the camera proceeds (S910).

Specifically, the processor 870 receives a preview image (or a real-time image) through the camera that is included in the sensing unit 820.

The preview image is an image that results from processing in real time an image that is captured by the camera, and is distinguished from a captured still image or a moving image.

Further, in the present specification, instead of the term preview image, the term image is used.

The processor 870 activates the camera based on a preset condition being satisfied. Specifically, the processor 870 activates (or turns on) the camera so the image is received, based on the preset condition being satisfied.

Preset conditions can include a condition that a distance between a preset destination and a vehicle is equal to or shorter than a fixed distance, a condition that a vehicle travels into an area that is at a fixed distance from the preset destination, and a condition that the user makes a request to activate the camera.

The fixed distance is variable according to the preset destination.

For example, if the number of obstacles in the vicinity of the preset destination, which obstruct a driver's field of view, is small, the fixed distance in this case is defined as a first distance. In addition, if the number of obstacles in the vicinity of the preset destination, which obstruct a driver's field of view, is great, the fixed distance in this case is defined as a second distance that is shorter than the first distance.

Thus, based on the preset condition being satisfied, the processor 870 activates (or turns on) the camera, and receives an image (for example, a preview image or a real-time image) through the camera.

Subsequently, according to the present disclosure, based on the preset destination being identified from the image, a step of outputting a graphic object to the display unit 830 so the graphic object is superimposed on the destination proceeds (S920).

Specifically, when a destination is set according to the user's request, the processor 870 sets information on a path from a current location of the vehicle to the destination that is set, and outputs the information on the path to the display unit 830.

In addition, the destination is set to be in the information on the path, which is set, and the destination is referred to as a preset destination in the present specification.

Further, based on the preset condition being satisfied (for example, based on the vehicle traveling into an area that is at a fixed distance from the preset destination), the processor 870 activates (or turns on) the camera, and receives an image through the camera.

The processor 870 analyzes the image, and identifies an object that corresponds to the preset destination, from the image. The object means the image that results from image-capturing the actual appearance of the preset destination through the camera.

Based the information (for example, location information, information relating to an appearance, or the like) relating to the destination, as an example, the processor 870 identifies the preset destination from the image.

As an example, the information relating to the destination is stored in a memory, or is received from an external apparatus (for example, a mobile terminal, another vehicle, the Internet, a server, or the like) through the communication unit 810.

The processor 870 identifies the preset destination from the image that is received through the camera, using the image that is received through the camera and the information relating to the destination.

Based on the preset destination being identified from the image, the processor 870 outputs a graphic object to the display unit 830 so the graphic object is superimposed on the destination.

In addition, the outputting of the graphic object to the display unit 830 so the graphic object is superimposed on the destination means outputting the graphic object in an augmented reality way to a position through which the driver's gaze passes to reach the destination on the windshield (or the head-up display (HUD)).

The display unit 830 includes the windshield (or the HUD) of the vehicle and a glass window of the vehicle. The windshield of the vehicle may mean a glass window that is positioned in front of the vehicle. The glass window of the vehicle may mean a glass window that is positioned each of both sides of the vehicle or is positioned in rear of the vehicle.

The processor 870 may output the graphic object on the windshield or on the window.

In addition, the processor 870 may output the graphic object on the windshield or the window so the graphic object is superimposed on the destination when the driver takes a look at the destination.

In the present specification, for description convenience, the windshield will be given as an example of the display unit 830.

With reference to FIG. 11A, the identification of the destination (or the object that corresponds to the destination from the image that is received through the camera means that the destination 1100 is seen with the driver's eyes.

The processor 870 senses (determines, decides, detects, or extracts) a gaze 1140 of a driver 1130 through the sensing unit 820. Specifically, the processor 870 senses an area to which the gaze 1140 of the driver 1130 is fixed when the driver 1130 takes a look at a preset destination 1100, through the sensing unit 820.

As an example, the processor 870 image-captures the driver using the internal camera of the sensing unit 820 and senses the driver's gaze (and the area to which the driver's gaze is fixed) by analyzing the captured image.

Based on the gaze 1140 of the driver who takes a look at the destination 1110, the processor 870 senses an area of the display unit 830 (for example, the windshield), which the gaze 1140 (or the area to which the driver's gaze is fixed) passes through (pierces through or passes via).

Subsequently, the processor 870 outputs a graphic object 1110 on the area of the display 830, which the user's gaze passes through (pierces through or passes via).

Accordingly, the processor 870 outputs the graphic object on the display unit 830 (the windshield or the window) so the graphic object is superimposed on the destination when the driver takes a look at the destination.

Based on a location and a shape of the destination 1100 at which the driver takes a look being changed due to the vehicle's traveling, the processor 870 causes an output position and an output shape of the graphic object 1110 to be variable.

As an example, when the vehicle travels near the destination 1100, a size of the destination 1100 is enlarged when viewed from the driver (or the camera). Accordingly, the area to which the driver's gaze is fixed when the driver takes a look at the destination is also broadened, and thus the area of the display unit 830 (the windshield), through which the driver's gaze passes, is also broadened.

Accordingly, when the destination is approached, the processor 870 enlarges a size of the graphic object that is output so the graphic object is superimposed on the destination.

In addition, when a direction in which the driver takes a look at the destination 1100 is changed, the shape of the destination appears different when viewed from the driver (or the camera). In this instance, as a direction in which the camera of the vehicle (or the driver) faces the destination is changed, the shape of the destination is changed. At this time, the processor 870 causes the output shape of the graphic object, which is output, to be variable so the graphic object is superimposed on the destination in order to correspond to the changed shape of the destination.

A method of providing a user interface through which the destination is easily recognized, according to an embodiment of the present disclosure, will be described in more detail with reference to FIG. 10.

First, with reference to FIG. 10, the processor 870 receives (acquires) specific information 1000 through the communication unit 810.

Pieces of specific information 1000 include GPS information, vehicle-to-everything (V2X) information, navigation information, big data, map data, information to a vehicle that is measured in an inertial measurement unit (IMU), information that is provided by an advanced driver assist system (ADAS), and information from the third party.

Using the specific information 1000, the processor 870 acquires a current location (GPS) of the vehicle, a visual traveling record (a visual odometry), a location of a destination (a point-of-interest (POI) GPS), a camera-captured image, a preference level of a POI in the vicinity of the vehicle, and meta data on a destination or the POI.

In addition, the vehicle control device 800 according to the present disclosure includes a database (a reference image database) 1010 which the graphic object (a reference image) that is output in such a manner the graphic object is superimposed on the destination is possibly stored in or is possibly retrieved from.

The processor 870 receives (requires) the graphic object (the reference image) from the database 1010.

Subsequently, the processor 870 determines whether or not the preset destination is identified (or seen) from the image that is received through the camera (S1020).

Subsequently, the processor 870 determines whether or not a distance between the vehicle and the destination (the POI) is equal to or shorter than a fixed distance x (S1030).

When the distance between the vehicle and the destination (POI) is equal to or shorter than the fixed distance x, based on the object that corresponds to the destination (the POI), an image of which can be currently captured by a camera (or which is currently inside of camera view), the processor 870 selects a graphic object (a reference image) that is to be displayed so the graphic object is superimposed on the destination, from the database (S1040).

Subsequently, using the image (a current camera frame) that is currently received through the camera and the selected graphic object (the reference image), the processor 870 matches the graphic object to an area (a POI area) that corresponds to the destination. In addition, the matching of the graphic object to the area that corresponds to the destination, as illustrated in FIG. 11A, means determining an output area on which the graphic object is displayed so the graphic object is superimposed on the destination when the driver takes a look at the destination.

Further, when the distance between the vehicle and the destination (the POI) is longer than the fixed distance x, the processor 870 determines a location of the destination (or displays the location of the destination on the display unit 830), by performing interpolation of GPS information (information on the location of the vehicle and information on the location of the destination) and data (information) of the visual odometry and coordinate conversion of the camera image. The location of the determined destination includes coordinates of the graphic object for the destination (the POI) in a camera coordinate system.

Subsequently, the coordinates of the graphic object for the destination (the POI) in the camera coordinate system and the information (meta data) relating to the destination are transmitted to an AR graphic rendering engine that is included in the processor 870 (or the vehicle control device 800) (S1070). Using the coordinates of the graphic object for the destination in the camera coordinate system and the information relating to the destination, the AR graphic rendering engine performs AR graphic rendering.

The AR graphic rendering means outputting the graphic object on the windshield and the window so the graphic object is superimposed on the destination when the driver takes a look at the destination.

Subsequently, based on at least one of the following: the camera-captured image, the coordinates of the graphic object for the destination in the camera coordinate system, and the information relating to the destination, the processor 870 (or the AR graphic rendering engine) outputs destination (POI) information so the destination (POI) information is superimposed on the destination (outputs the destination (POI) information to the vicinity of the destination) (S1080).

The destination information is the information relating to the destination, and includes a name of the destination and various pieces of information (for example, a floor on which the destination is positioned, opening hours, a preference level, a grade average, an evaluation report, a destination mark, and parking-lot information) relating to the destination.

The destination information is included in the graphic object that is displayed on the display unit 830. In addition, the destination information is displayed on the display unit 830 so the destination information is superimposed on the destination or so a portion of the destination information is superimposed on the destination, or is displayed on the vicinity of the destination.

In the same manner, based on the location and the shape of the destination at which the driver takes a look being changed due to the vehicle's traveling, the output position and the output shape of the destination information are also caused to be variable.

Various ways of outputting the graphic object so the graphic object is superimposed on the destination will be described in more detail below with reference to the accompanying drawings.

An example will be described in which the display unit 830 is the windshield and the graphic object is output in an AR manner so the graphic object is superimposed on the destination when the driver takes a look at the destination.

However, a description that will be provided below applies analogically as the same or similar as the description in which, when the image that is received through the camera is output to at least one display that is provided in the vehicle, the graphic object is output so the graphic object is superimposed on the destination (or the object that corresponds to the destination) that is identified from the image.

Further, when a preset destination is identified from the image that is received through the camera, the processor 870 outputs pieces of information (graphic objects relating to different types of destinations) relating to different types of destinations, to the display unit 830.

With reference to FIG. 11B(a), the processor 870 identifies a preset destination 1100 from an image that is received through the camera. For example, the processor 870 identifies an object that corresponds to the preset image from the image.

In this instance, the processor 870 outputs a graphic object 1110*a* to the display unit 830 so the graphic object 1110*a* is superimposed on the destination 1100 when the driver takes a look at the preset destination 1100.

In addition, when the destination 1100 is included in a building (or when the destination 1100 is a building), the processor 870 outputs the graphic object 1110*a*, which corresponds to a peripheral edge of the building, to the display unit 830 so the graphic object 1110*a* is superimposed on the building.

At this time, when a distance between the vehicle and the preset destination 1100 is a first distance (for example, 200 m to 500 m), the processor 870 further displays a first-type graphic object 1120 (for example, as illustrated in FIG. 11B(a), map information that includes information on a path for the vehicle to travel on from a current location of the vehicle to the destination) on the display unit 830.

In addition, when the distance between the vehicle and the preset destination 1100 is a second distance (for example, 100 m to 200 m) that is shorter than the first distance, the processor 870 further displays a second-type graphic object (for example, as illustrated in FIG. 11B(b), a graphic carpet 1150 expressing a path for the vehicle to travel on up to the destination) that is different from the first-type graphic object 1120, or turn-by-turn navigation information 1160 on the display unit 830.

Further, the processor 870 outputs graphic objects 1110*a* and 1110*b* that are to be displayed so the graphic object 1110*a* and 1110*b* are superimposed on the destination, in different ways according to a distance between the vehicle and the destination.

For example, when the distance between the distance between the vehicle and the destination is the first distance, an identification level of a shape or a contour of the destination is low. In this instance, graphic objects that are output in the case of the first distance are collectively formed into a specific shape.

That is, when the distance between the vehicle and the destination is the first distance, the processor 870 outputs a specific-type graphic object 1110*a* so the specific-type graphic object 1110*a* is superimposed on the destination.

As another example, when the distance between the vehicle and the destination is the second distance that is shorter than the first distance, the identification level of the shape (the contour) of the destination is higher than in the situation of the first distance.

In this instance, when the distance between the vehicle and the destination is the second distance that is shorter than the first distance, the processor 870 extracts the shape (the contour) of the destination from the image that is received through the camera.

In addition, when the distance between the vehicle and the destination is the second distance, the processor 870 outputs the graphic object 1110*b* that corresponds to the shape (the contour, or the peripheral edge) of the destination, so the graphic object 1110*b* is superimposed on the destination.

Further, based on whether or not the building including the destination is identified from the image that is received through the camera, and whether or not the building including the destination is all included in the image, the processor 870 outputs a graphic object to the display unit 830 in different ways.

For example, when the building including the destination is not identified from the image, the processor 870 outputs a first graphic object (for example, the destination information) that includes the information relating to the destination, to the display unit 830.

As an example, the first graphic object may be the destination information that is "Y Station" that is illustrated in FIGS. 11B(a) and 11B(b).

At this time, the first graphic object is output to a position where the driver's gaze is fixed to a location where the destination is present.

As another example, when the building including the destination is identified from the image (in the situation of FIGS. 11B(a) and 11B(b)), the processor 870 outputs a second graphic object 1110*a* or 1110*b* that is formed to correspond to an edge of the building, along with the first graphic object (for example, the destination information), to the display unit 830.

Further, when the building including the destination is identified from the image, but only a portion of the building is included in the image, the processor 870 outputs a third graphic object to the display unit 830 so the third graphic object is superimposed on a portion of the building, in which the destination is positioned.

In addition, the situation where the building which includes the destination is identified from the image, but only a portion of the building is included in the image means a situation where the distance between the vehicle and the destination is a third distance (for example, 0 to 100 m) that is shorter than the second distance and thus where the driver cannot see the entire building from within the vehicle.

In addition, the situation where only a portion of the building is included in the image means a situation where the entire building is not included in the image, a situation where the driver cannot see the entire building through the windshield, or a situation where the driver sees only a portion of the building through the windshield.

Figure 12A:
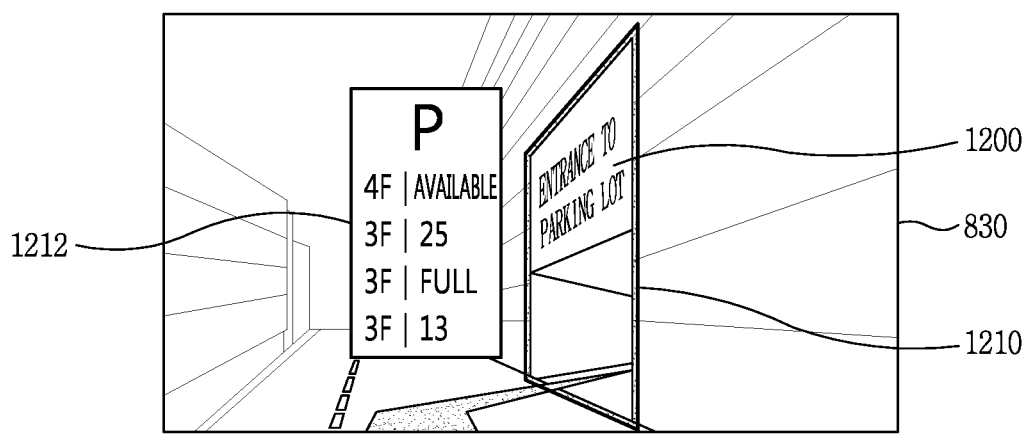
Figure 12B:
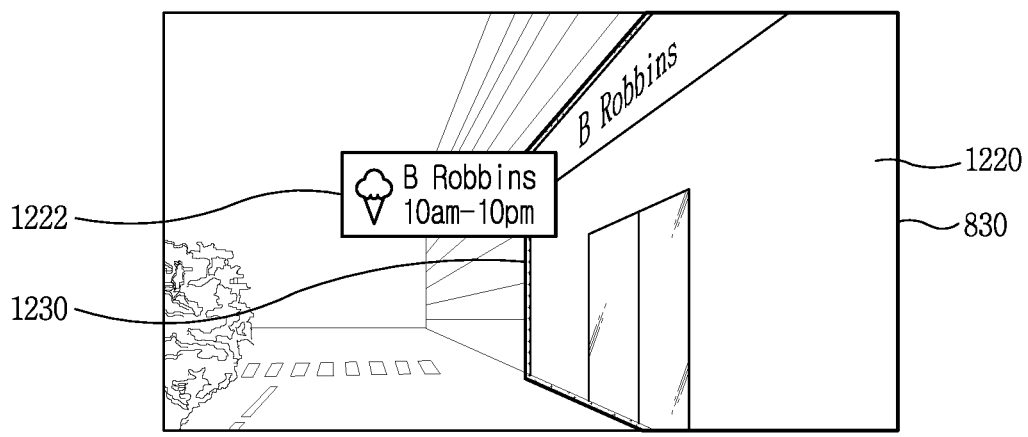

For example, as illustrated in FIGS. 12A and 12B, when the distance between the vehicle and the destination is short and thus where only a portion of the building is included in the image, the processor 870 outputs a third graphic object 1210 to the display unit 830 so the third graphic object 1210 is superimposed on an entrance 1200 to a parking lot that is included in the building, or outputs a third graphic object 1230 to the display 830 so the third graphic object 1230 is superimposed on the destination 1220 which is included in the building.

In addition, the processor 870 outputs information 1212 relating to a parking lot in the building, along with the third graphic object 1210, or outputs the destination information 1222, along with the third graphic object 1230.

Figure 13A:
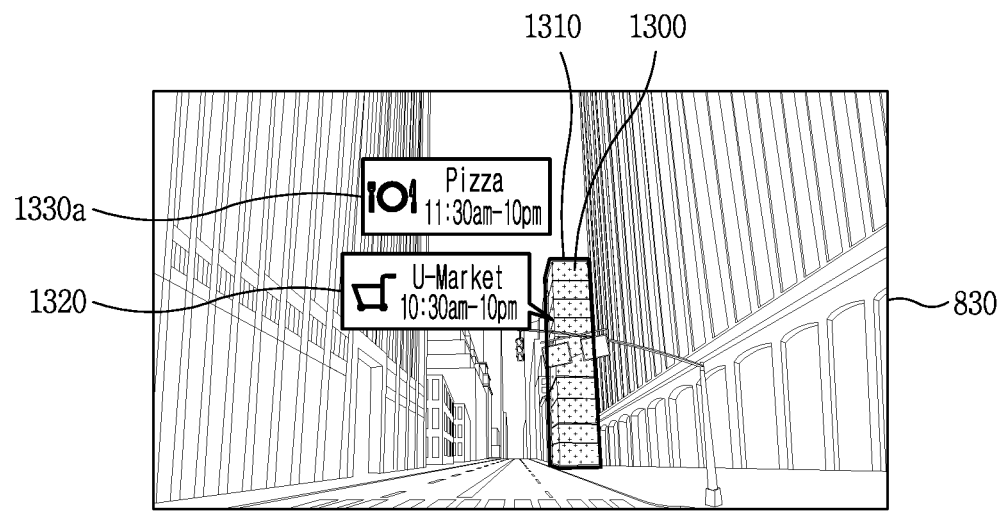

In addition, as illustrated in FIG. 13A, when an entire building 1300 is identified from the image, the processor 870 outputs a graphic object 310 that is formed so the graphic object 1310 is superimposed on only the edge of the building, to the display unit 830 so the graphic object 1310 is superimposed on the peripheral edge of the building.

Figure 13B:
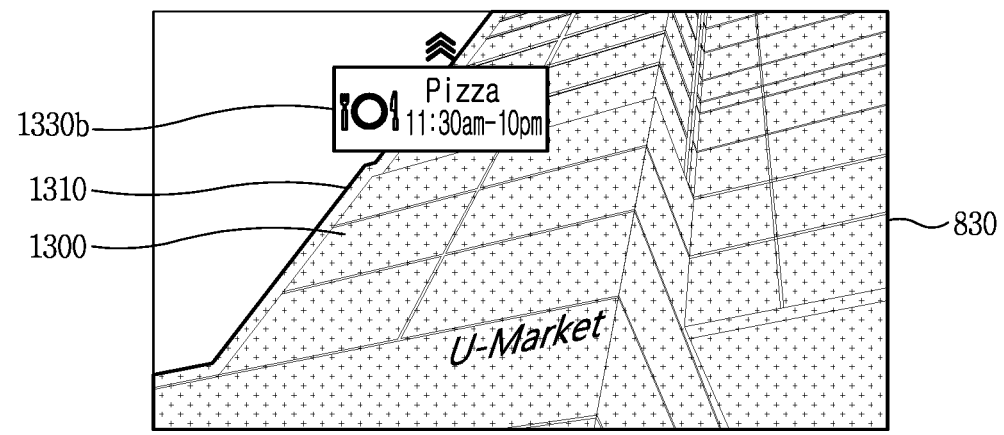

In addition, as illustrated in FIG. 13B, when only a portion of the building is identified from the image, the processor 870 outputs a graphic object 1310 that is highlighting-processed also for the inside of a portion of the building, to the display unit 830 so the graphic object 1310 is superimposed on the portion of the building.

Further, as illustrated in FIG. 13A, when the entire building including the destination is identified from the image that is received through the camera, the processor 870 outputs information 1320 relating to the building to the display unit 830.

In addition, as illustrated in FIG. 13A, when the entire building including the destination is identified from the image that is received through the camera, the processor 870 outputs the information 1330a (the destination information) relating to the destination to the display unit 830 so the information 1330a is superimposed on the vicinity of the building or only a portion of the building.

Further, as illustrated in FIG. 13B, when only a portion of the building including the destination is identified from the image, the processor 870 does not output the information 1320 relating to the building to the display unit 830.

In addition, as illustrated in FIG. 13B, when only a portion of the building including the destination is identified from the image, the processor 870 outputs information 1330b relating to the destination, to a position that corresponds to a place in the building, where the destination is positioned.

Further, based on the distance between the vehicle and the destination, the processor 870 outputs a graphic object relating to the parking lot in the destination in a preset way to the display unit 830.

Figure 14A:
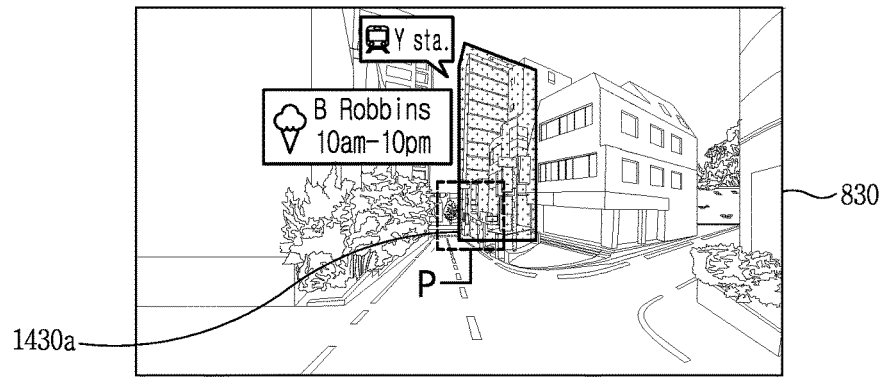

For example, as illustrated in FIG. 14A, when a distance between the building (or the destination) including the destination, and the vehicle is the first distance, the processor 870 outputs a graphic object 1430a relating to the parking lot in a first way to the display unit 830.

At this time, as an example, the first way is to use a simple icon indicating a name of the parking lot or the presence and absence of the parking lot.

Figure 14B:
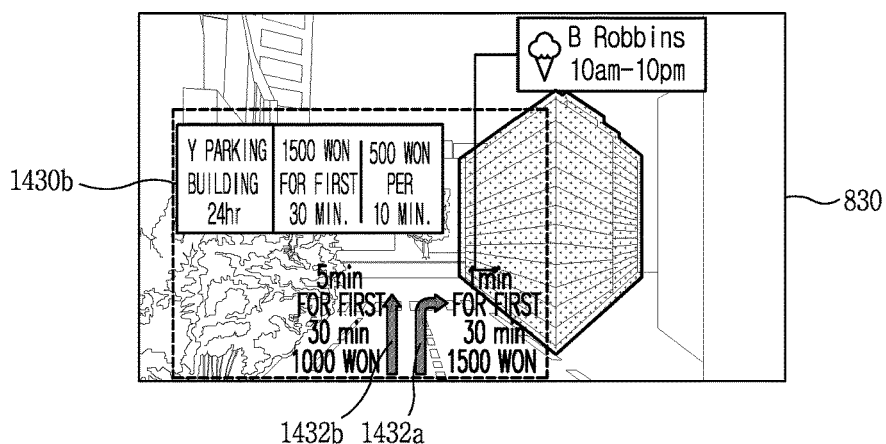

As illustrated in FIG. 14B, if the distance between the building and the vehicle is the second distance that is shorter than the first distance, the processor 870 outputs a graphic object 1430b relating to the parking lot in a second way that is different from the first way, to the display unit 830.

The second way here, as illustrated in FIG. 0.14, is a way in which a graphic object is output so the graphic object further includes detailed pieces of information, such as a parking fee and parking-lot opening hours. The graphic object 1430b relating to the parking lot, which is output in the second way, includes more detailed information than the graphic object that is output in the first way.

In addition, when the distance between the building and the vehicle is equal to or shorter than the second distance, as illustrated in FIG. 14B, the processor 870 further outputs a first object 1432a that guides the vehicle to travel along a path to a parking lot in the building including the destination, and a second graphic object 1432b that guides the vehicle to travel along a path to a parking lot that is present within a fixed distance from the building.

The first and second graphic carpets 1432a and 1432b include information relating to the parking lots, respectively, and are output to the display unit 830 so the first and second graphic carpets 1432a and 1432b are superimposed on a road on which the vehicle is to travel.

That is, when the vehicle travels into an area that is a fixed distance (for example, the second distance) from the building including the destination, the processor 870 outputs the first graphic object (or the first graphic carpet) relating to the parking in the building including the destination and the second graphic object (or the second graphic carpet) relating to another parking lot that is present within a fixed distance from the parking lot in the building, to the display unit 830, so the first and second objects are superimposed on a road on which the vehicle is to travel.

Figure 14C:
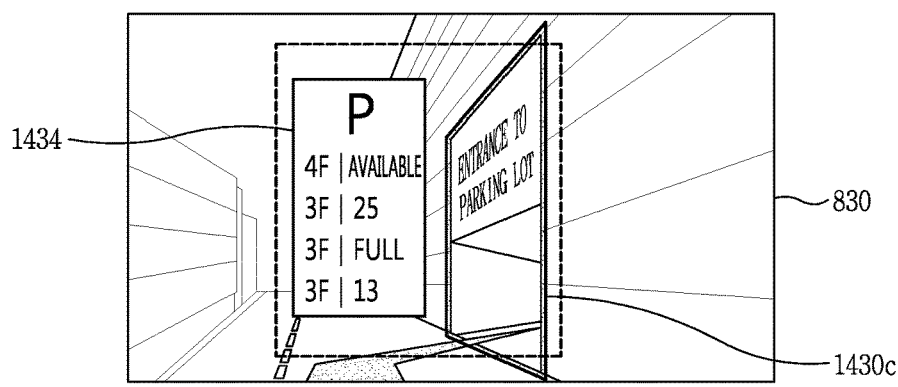

Subsequently, as illustrated in FIG. 14C, when the entrance 1200 to the parking lot in the building including the destination is identified from the image that is received through the camera (or when the distance between the building and the vehicle is the third distance that is shorter than the second distance) (or when only a portion of the building is identified from the image that is received through the camera), the processor 870 outputs a graphic object 1434 to the display unit 830 so graphic object 1434 is superimposed on the entrance 1220 to the parking lot.

At this time, the processor 870 further outputs a graphic object (or a graphic object that is output in a third way) that includes information indicating an available parking space on each floor of the parking lot, to the display unit 830.

In addition, when the parking in the destination is full (that is, there is no parking space available), the processor 870 outputs a graphic object of a first color (for example, a red-based color) so the graphic object is superimposed on the building including the destination.

In addition, if the parking lot in the destination is not full, the processor 870 may output a graphic object of a second color (for example, a blue-based color) that is different from the first color, so the graphic object is superimposed on a building (or a parking lot) in which parking is possible and which is positioned within a fixed distance from the destination.

Further, based on a speed of the vehicle that is currently traveling, the processor 870 outputs graphic objects relating to the destination to the display unit 830 in different shapes.

The processor 870 determines whether or not the parking lot is full, based on information that is received from a server in the building or the Internet through the communication unit 810.

Figure 15:
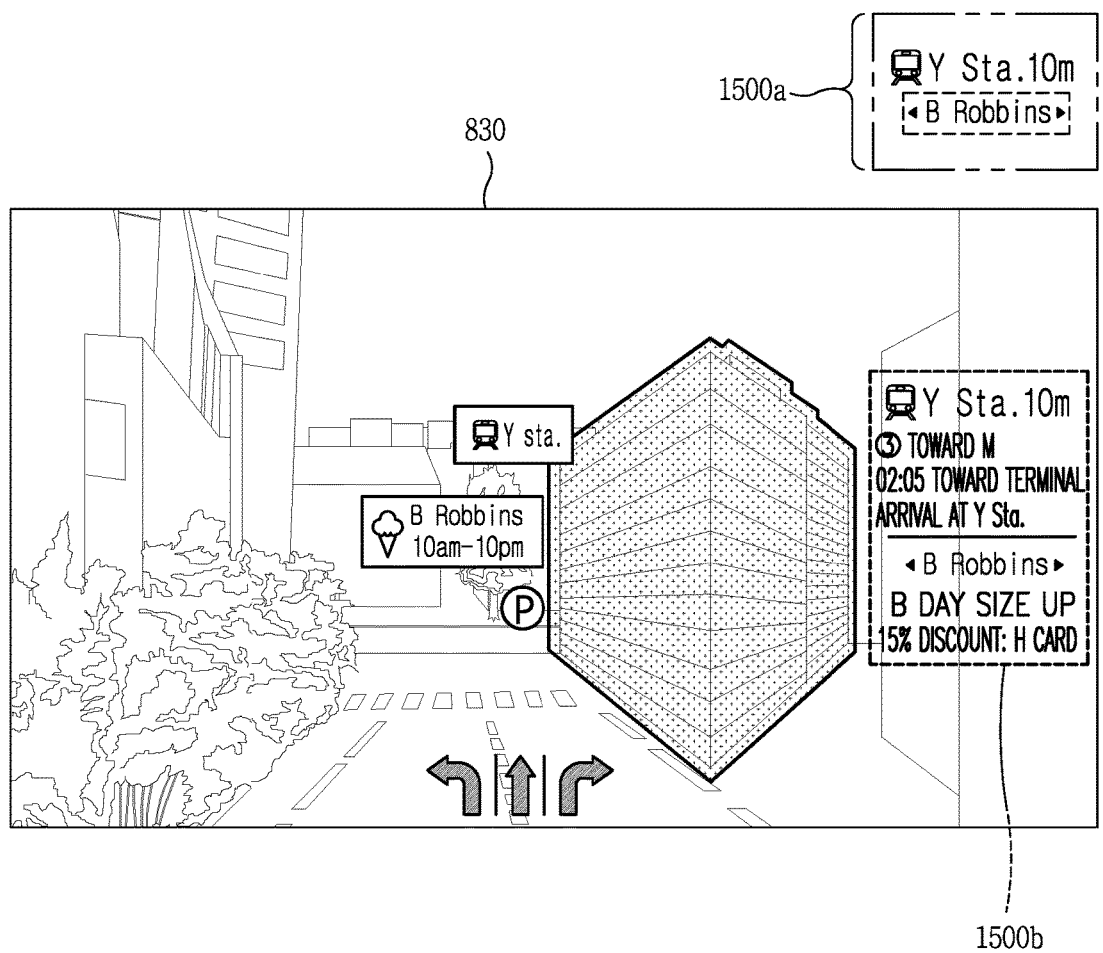

For example, the processor 870, as illustrated in FIG. 15, controls the display unit 830 so a graphic object including the information (for example, a name of the destination, a remaining distance to the destination, or an advertisement associated with the destination, or the like) relating to the destination is output to the vicinity of the destination.

At this time, the higher the speed of the vehicle that is currently traveling, the more simply the processor 870 outputs the graphic object relating to the destination. The lower the speed of the vehicle that is currently traveling, the more detailed graphic object relating to the destination the processor 870 outputs.

For example, when the speed of the vehicle that is currently traveling is a first speed (for example, a speed that is equal to or higher than a specific speed), the processor 870 outputs a first-type graphic object 1500a (for example, the name of the destination and the remaining distance to the destination) to the display unit 830.

As another example, when the speed of the vehicle that is currently traveling is a second speed (for example, a speed that is lower than the specific speed) that is lower than the first speed, the processor 870 displays a second-type graphic object 1500b (for example, the name of the destination, the remaining distance to the destination, detailed information relating to the destination (for example, start time of a next train when the destination is a station or a subway station, or a chef-recommended dish or an event when the destination is a restaurant)).

That is, the higher the speed of the vehicle, the more simply the processor 870 outputs the graphic object relating to the destination. The lower the speed of the vehicle, the more detailed graphic object (the information) relating to the destination the processor 870 outputs.

In addition, the processor 870 determines whether or not the vehicle stops due to the traffic light. When the vehicle stops due to the traffic light, the processor 870 outputs the second-type graphic object 1500b. When the vehicle starts to travel due to the traffic light, the processor 870 outputs the first-type graphic object 1500a to the display unit 830.

Further, the graphic object that is output so the graphic object is superimposed on the destination according to the present disclosure is output in various shapes.

When the destination is identified from the image that is received through the camera, the processor 870 outputs the graphic object to the display unit 830 (the windshield or the window) so the graphic object is superimposed on the destination when the driver takes a look at the destination.

Figure 16A:
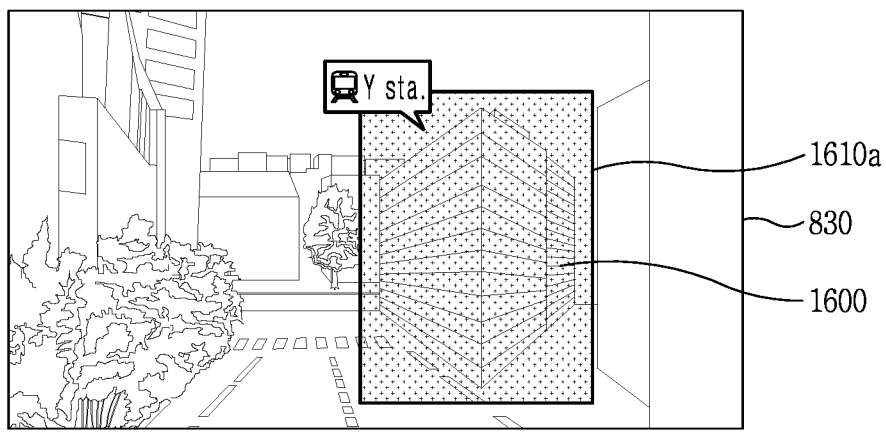

At this time, the processor 870, as illustrated in FIG. 16A, outputs a specific-type graphic object 1610a so the specific-type graphic object 1610a is superimposed on the destination in order to include an entire shape of the destination. In this instance, although the shape of the destination is changed as the vehicle travels, the shape of graphic object 1610a is maintained and only a size thereof is caused to be variable.

Figure 16B:
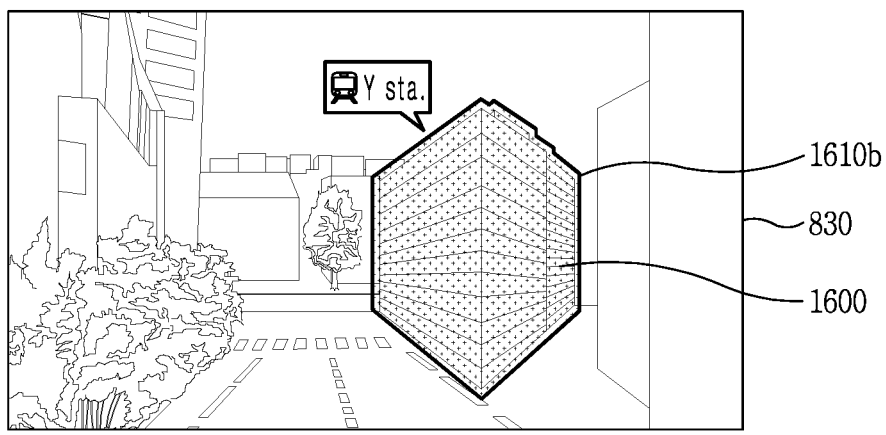

As another example, as illustrated in FIG. 16B, the processor 870 outputs a graphic object 1610b that is formed to correspond to a peripheral edge of the destination, to the display unit 830 so the graphic object 1610b is superimposed on the destination.

In addition, when the distance between the vehicle and the destination is the first distance, the processor 870 outputs the specific-type graphic object 1610a to the display unit 830.

When the distance between the vehicle and the destination is the second distance that is shorter than the first distance (that is, when the vehicle travels near the destination), the processor 870 outputs the graphic object 1610b that is formed to correspond to the peripheral edge, to the display unit 830, so the graphic object 1610b is superimposed on the destination.

Figure 17:
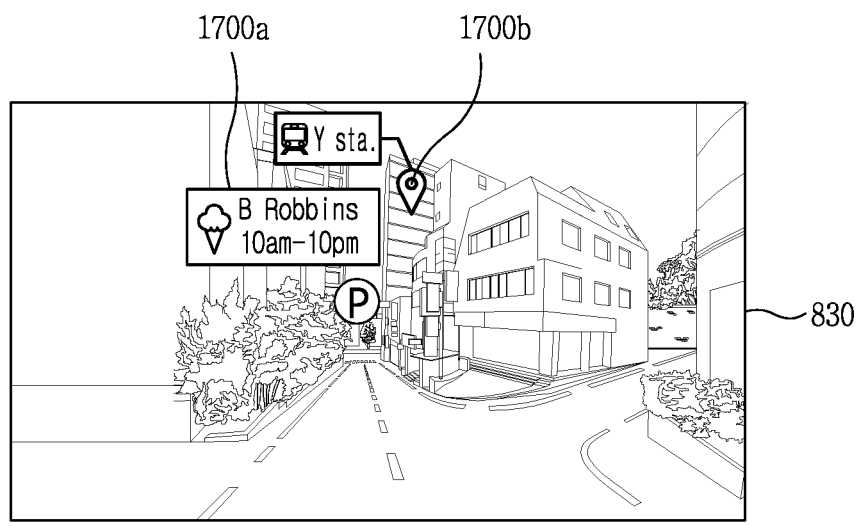

As an example, as illustrated in FIG. 17, when the destination is identified from the image that is received through the camera, the processor 870 outputs a graphic object 1700a including the destination information to the destination unit 830.

As another example, as illustrated in FIG. 17, when the destination is identified from the image that is received through the camera, the processor 870 may output the graphic object 1700a including the destination information and an icon 1700b that guides the vehicle to the location of the destination, together to the display unit 830.

Further, when the destination is a vacant lot (for example, when a parking lot is present on the plain ground), the processor 870 outputs a wall-shaped graphic object so the wall-shaped graphic object is superimposed on the vacant lot, in order to identify a border of the vacant lot.

Figure 18A:
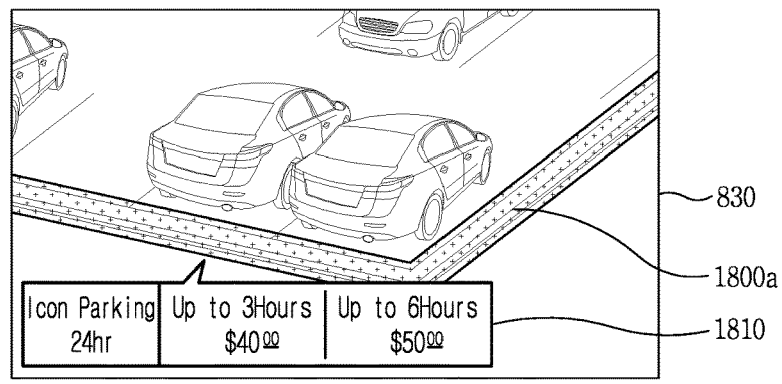

For example, as illustrated in FIG. 18A, when the destination is the vacant lot, the processor 870 outputs a wall-shaped (fence-shaped) graphic object 1800a to the display unit 830 so the wall-shaped graphic object 1800a is superimposed on the vacant lot, in order to identify the border of the vacant lot.

At this time, as illustrated in FIG. 18A, the processor 870 further outputs information 1810 (for example, the information relating to the parking lot when the vacant lot is a parking lot) relating to the vacant lot to the display unit 830.

Further, when the entrance to the parking lot in the building including the destination is identified from the image that is received through the camera, the processor 870 outputs the graphic object so the graphic object is superimposed on the entrance to the parking lot.

Figure 18B:
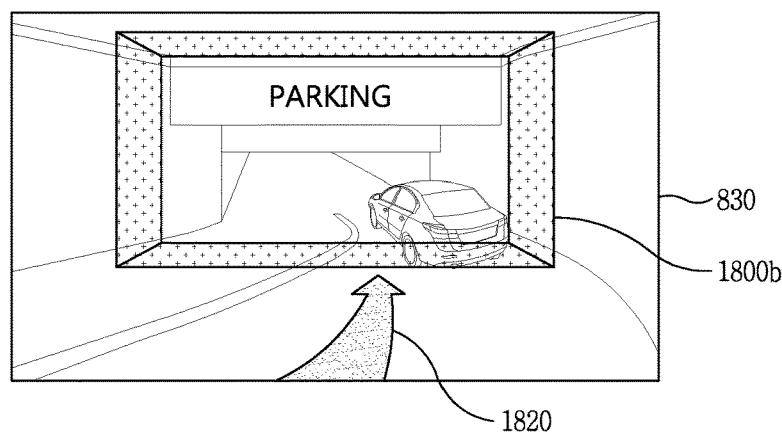

At this time, when the parking lot is an underground parking lot, as illustrate in FIG. 18B, the processor 870 outputs a tunnel-shaped graphic object 1800b indicating an entrance to the parking lot and an arrow-shaped object 1820 that guides the vehicle to travel along a path to the entrance to the parking lot, to the display unit 830.

Figure 18C:
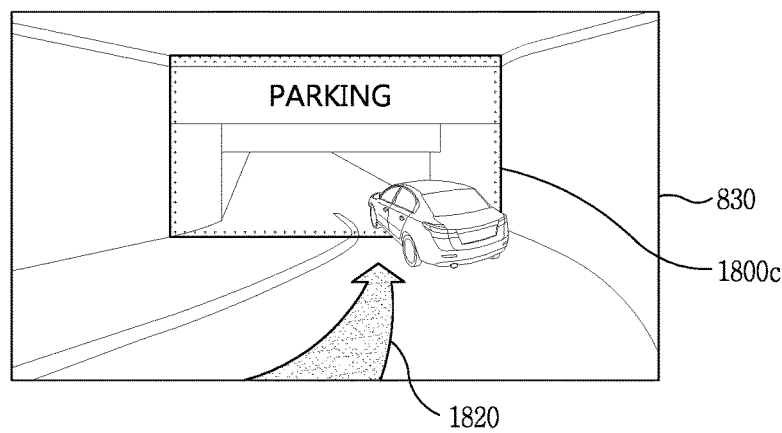

In addition, as illustrated in FIG. 18C, when the parking lot is the underground parking lot, the processor 870 may output a graphic object 1800c that is formed so the graphic object 1800c is superimposed on a peripheral edge of the entrance to the parking lot, so the graphic object 1800c is superimposed on the entrance to the parking lot.

In addition, when the vehicle is going to drive into the parking lot, the processor 870 determines whether or not vehicles wait in a queue before driving into the parking lot, using the sensing unit 820 or the communication unit 810.

Figure 19A:
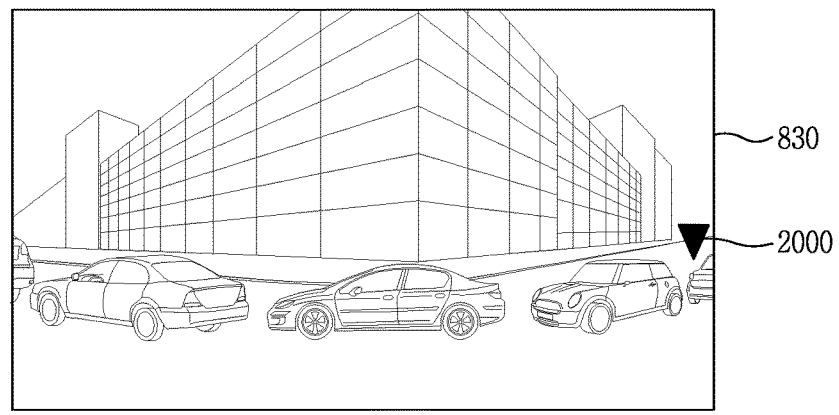

Specifically, as illustrated in FIG. 19A, when there are many vehicles to drive into the parking lot, the many vehicles wait in a queue before driving into the parking lot.

In this instance, the processor 870 determines a location of the last vehicle in a queue through the camera that is included in the sensing unit 820, or determines a location of the last vehicle in a queue through V2V communication by the communication unit 810.

Figure 19B:
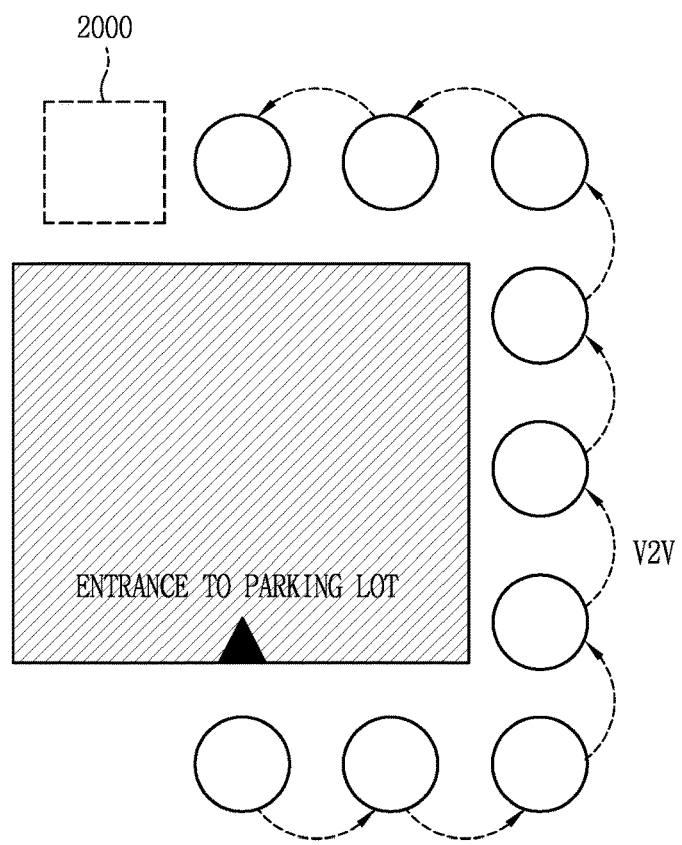

Subsequently, as illustrated in FIG. 19B, the processor 870 outputs a graphic object 2000 that guides the vehicle to behind the location of the last vehicle in a queue (or to a place where the next waiting vehicle has to be positioned), to the display unit 830.

Figure 20:
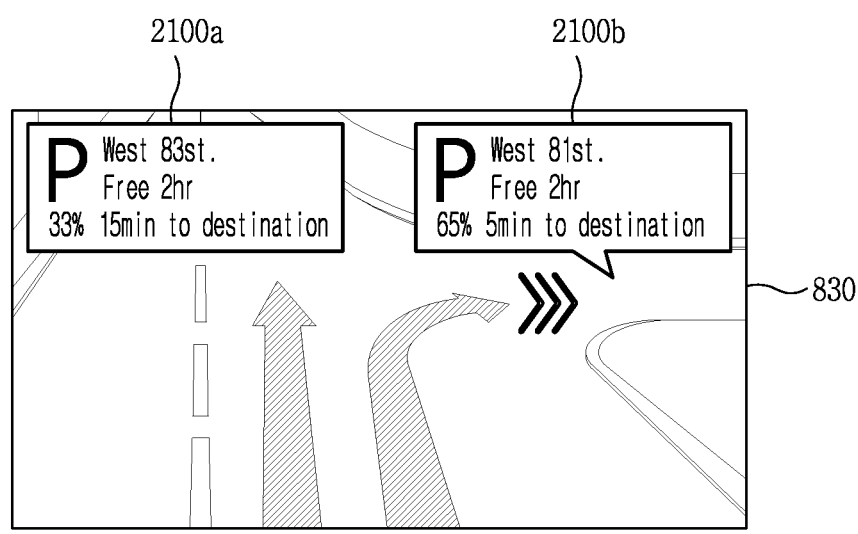

Further, as illustrated in FIG. 20, when the vehicle enters an intersection in a state where the destination is not identified from the image that is received through the camera, the processor 870 outputs pieces of time information 2100a and 2100b on the times it takes for the vehicle to travel to the destination along roads, respectively, to the display unit 830 so the pieces of time information 2100a and 2100b are superimposed on the roads, respectively.

For example, when, while traveling in a state where the destination is preset, the vehicle enters (or reaches) the crossroad in the state where the destination is not identified from the image, the processor 870 calculates pieces of time information on the times it will take for the vehicle to travel to the destination along roads, respectively, on a per road-at-the-crossroad basis.

For example, based on an amount of traffic on each road or traffic-congestion information, a distance that the vehicle is to travel to the destination along each road, speed limit on each road, and so forth, which are obtained from an external sever (or the Internet) through the communication unit 810, the processor 870 calculates pieces of time information on the times it will take for the vehicle to travel to the destination along each road.

Subsequently, the processor 870, as illustrated in FIG. 20, outputs a graphic object including the time information to the display unit 830. At this time, a name of each road is included in the graphic object.

In addition, when the vehicle enters each road, the processor 870 further include information relating to a parking lot that is possibly entered, in the graphic object.

Figure 21A:
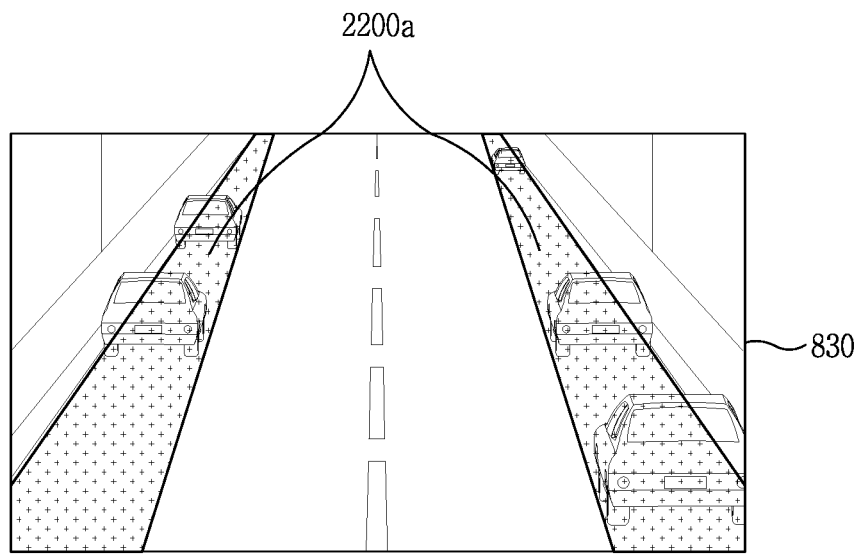
Figure 21B:
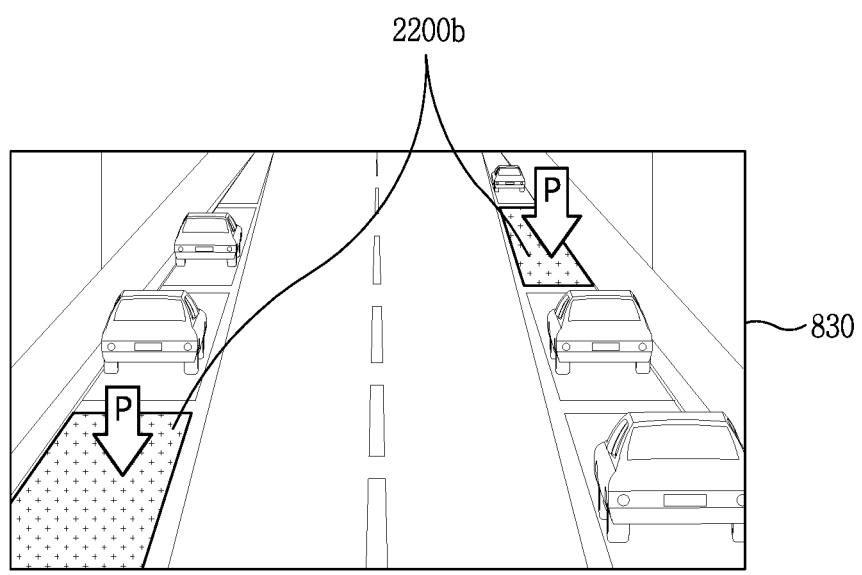

Further, as illustrated in FIGS. 21A and 21B, when a space along the road, which is available for parking, is sensed through the sensing unit 820, the processor 870 outputs graphic object 2200a or 2200b indicating that the space is available for the parking, to the display unit 830 so the graphic object 2200a or 2200b is superimposed on the space.

For example, as illustrated in FIG. 21A, in a state where the vehicle travels into an area that is at a fixed distance from the destination, when the parking lot along the road is sensed through the sensing unit 820, the processor 870 outputs the graphic object 2200a that is formed to correspond to the parking lot along the road, to the display unit 830 so the graphic object 2200a is superimposed on the parking lot along the road.

As another example, as illustrated in FIG. 21B, in a state where the vehicle travels into an area that is at the fixed distance from the destination, when a space that is available for parking in the parking lot along the road is sensed through the sensing unit 820, the processor 870 outputs the graphic object 2200b (for example, an icon) indicating that the parking is possible, so the graphic object 2200b is superimposed on the space that is available for parking.

Figure 22:
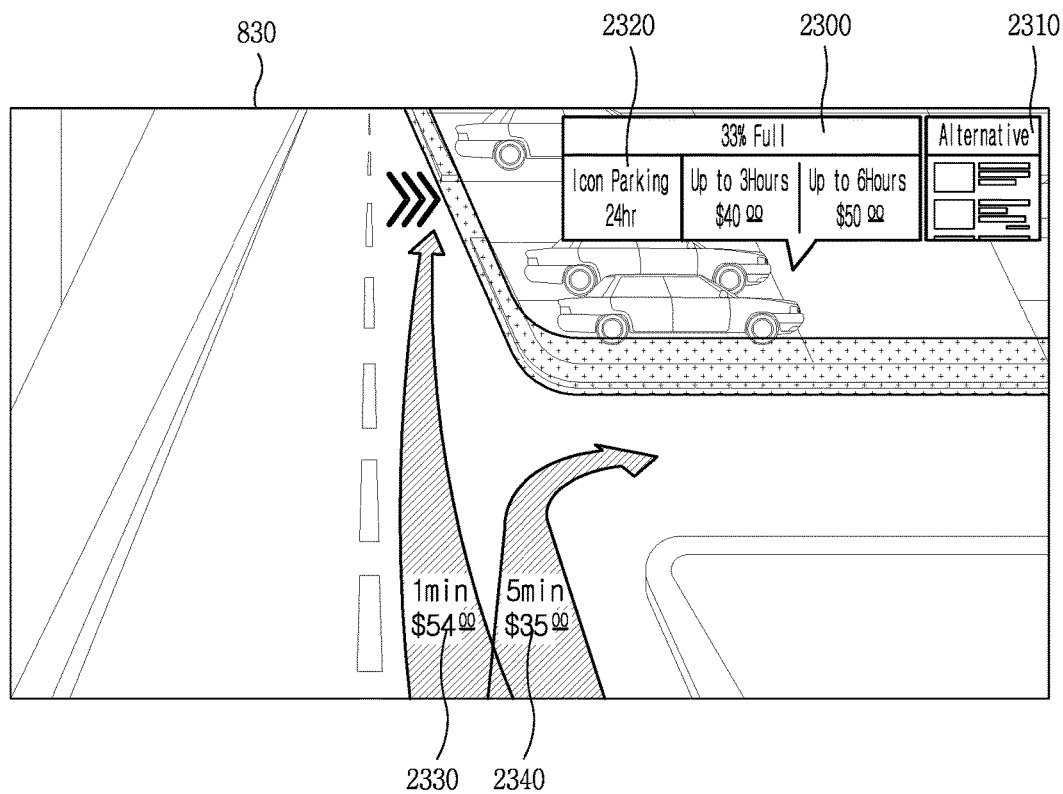

Further, as illustrated in FIG. 22, when a parking lot is sensed from the image that is received through the camera, the processor 870 outputs a graphic object so the graphic object is superimposed on the parking lot.

The graphic object includes a wall-shaped object, the number 2300 (a percentage) of remaining vacant spaces in the parking lot, information 2320 relating to the parking lot, and a list 2310 of parking lots other than the parking lot.

The processor 870 sets colors of the wall-shaped graphic object to be different from each other, according to the number (the percentage) of spaces that are available for parking.

In addition, as illustrated in FIG. 22, the processor 870 outputs a graphic object 2330 that guides the vehicle to travel along a path for entering the parking lot that is identified from the image, and a graphic object 2340 that guides the vehicle to travel along a path to another parking lot, to the display unit 830 so the graphic objects 2330 and 2340 are superimposed on the road.

For example, when priority levels of parking lots are set based on a driver preference (for example, the time to the destination, a toll, or the like), the processor 870 further outputs pieces of information relating to high priority-level parking lots other than the parking lot that is currently identified from the image, to the display unit 830.

Subsequently, when a high priority-level parking lot is selected through a user interface device according to a driver's request, the processor 870 changes the destination to the selected high priority-level parking lot, and outputs information on a path to the selected high priority-level parking lot.

In addition, when the parking lot, the path to which is currently guided, is full and thus parking is not possible, the processor 870 automatically changes the path information to information relating to a path to an alternative to the parking lot.

In addition, In addition, the alternative to the parking lot, as described above, is determined on a factor, based on which the user selects the alternative to the parking lot, such as the time to the destination, a toll, or the presence or absence of a parking space.

Further, the processor 870 provides a user interface through which the preset destination is possibly changed more conveniently.

Figure 23A:
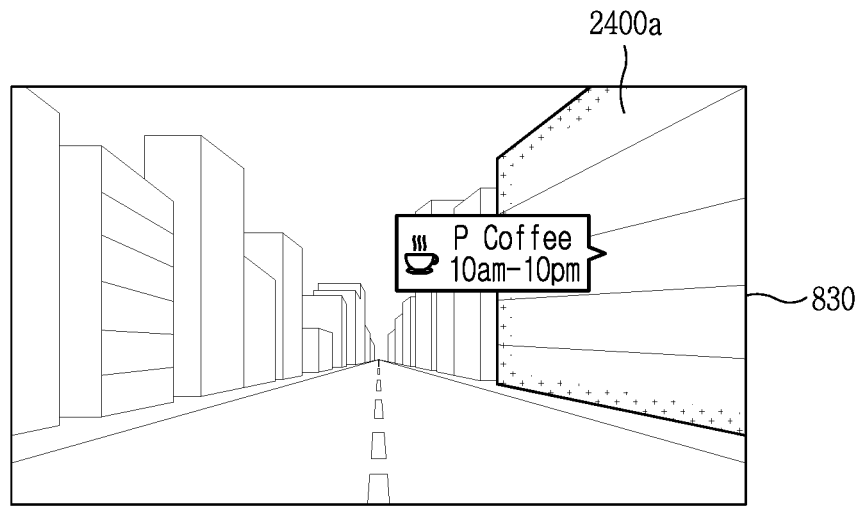

For example, as illustrated in FIG. 23A, when a preset destination 2400a is identified from the image that is received through the camera, the processor 870 outputs a plurality of graphic objects, graphic objects 2400a, 2400c, and 2400d, which indicate a plurality of destinations, respectively, that are included in the same category as the preset destination 2400a, to the display unit 830.

Figure 23B:
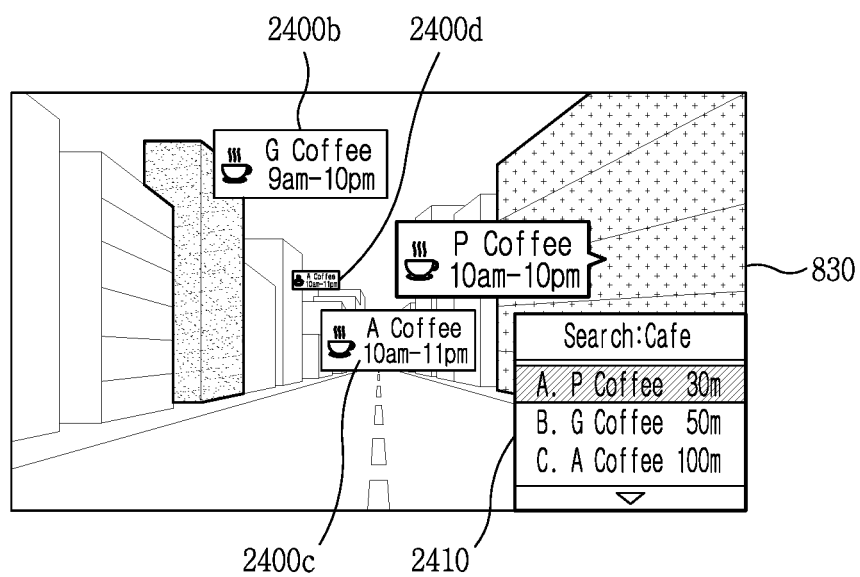

At this time, as illustrated in FIG. 23B, the processor 870 outputs the plurality of graphic objects, the graphic objects 2400b, 2400c, and 2400d, which indicate the plurality of destinations, respectively, that are included in the same category as the preset destination 2400a, to the display unit 830, so the graphic objects 2400b, 2400c, and 2400d are superimposed on the plurality of destinations, respectively (or is superimposed on a building including the plurality of destinations).

In addition, the processor 870 further displays a list 2410 of one or more destinations on the display unit 830.

Subsequently, when any of the plurality of graphic objects is selected (or when any destination is selected from the list 2410 of destinations), the processor 870 displays a graphic object so the graphic object is superimposed on the destination that corresponds to the selected graphic object.

Figure 23C:
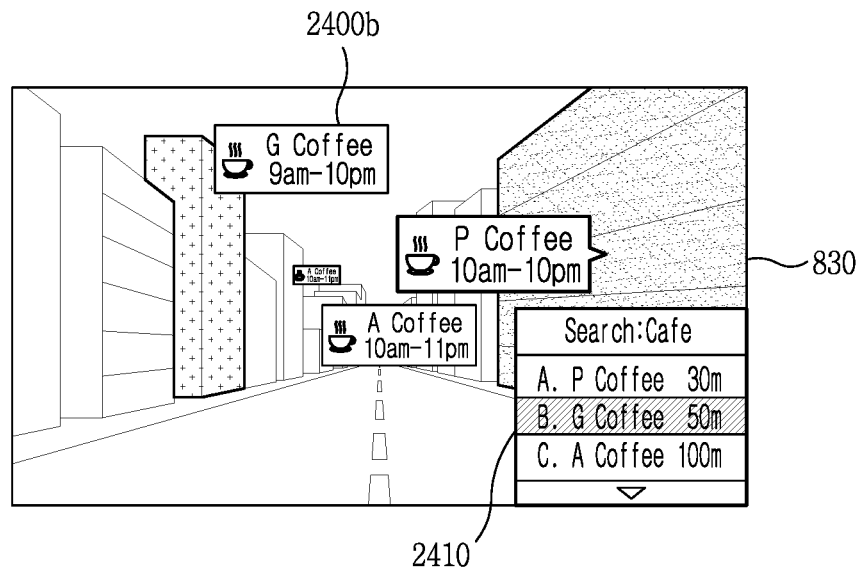
Figure 23D:
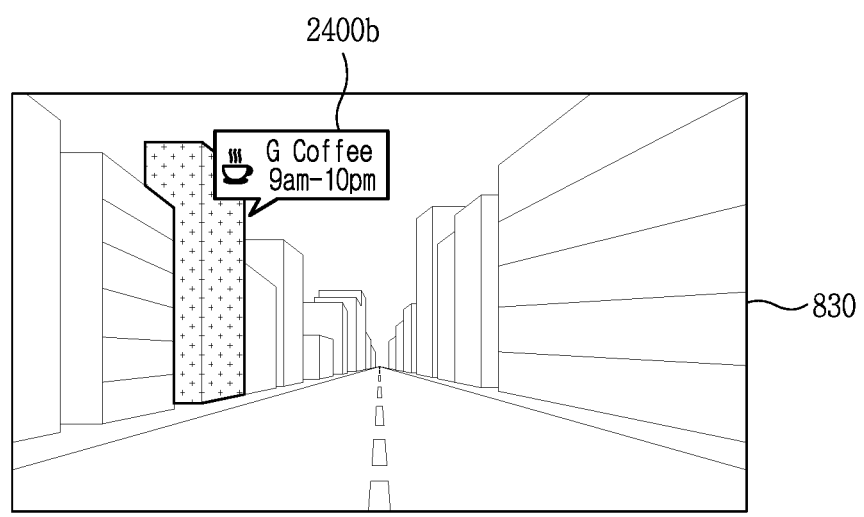

For example, when "G Coffee," as illustrated in FIG. 23C, is selected from among the plurality of destinations, the processor 870, as illustrated in FIG. 23D, outputs a graphic object (for example, a graphic object indicating a peripheral edge, or the destination information) to the destination unit 830, so the graphic object is superimposed on a building including "G Coffee."

At this time, the selection of one of the plurality of destinations is performed by maintaining the gaze that is fixed on one point, for a fixed time, is performed through a user interface device that is provided in the vehicle, or is performed by applying a touch to the display unit 830.

In addition, when the traveling mode of the vehicle is the autonomous traveling mode, the processor 870 moves a graphic object using a steering wheel.

For example, in the autonomous traveling mode, in a state where a destination is identified from the image and thus a graphic object is displayed so the graphic object is superimposed on the destination, when rotation of the steering wheel is detected, in response to the rotation of the steering wheel, the processor 870 changes a display position of the graphic object so the graphic object is superimposed on a different place (for example, a building or a vacant lot) that is present in the vicinity of the destination.

When the display position of the graphic object is changed, the processor 870 outputs information relating to the place on which the graphic object is superimposed, or information relating to the destination that is included in the same category and which is included in the place on which the graphic object is superimposed, to the display unit 830.

With this configuration, a user interface is provided through which, when the vehicle travels into an area that is at a fixed distance from the preset destination, a plurality of other destinations that are in the same category as the destination are proposed and the destination is possibly changed easily using the graphic object that is output to the windshield.

Figure 24:
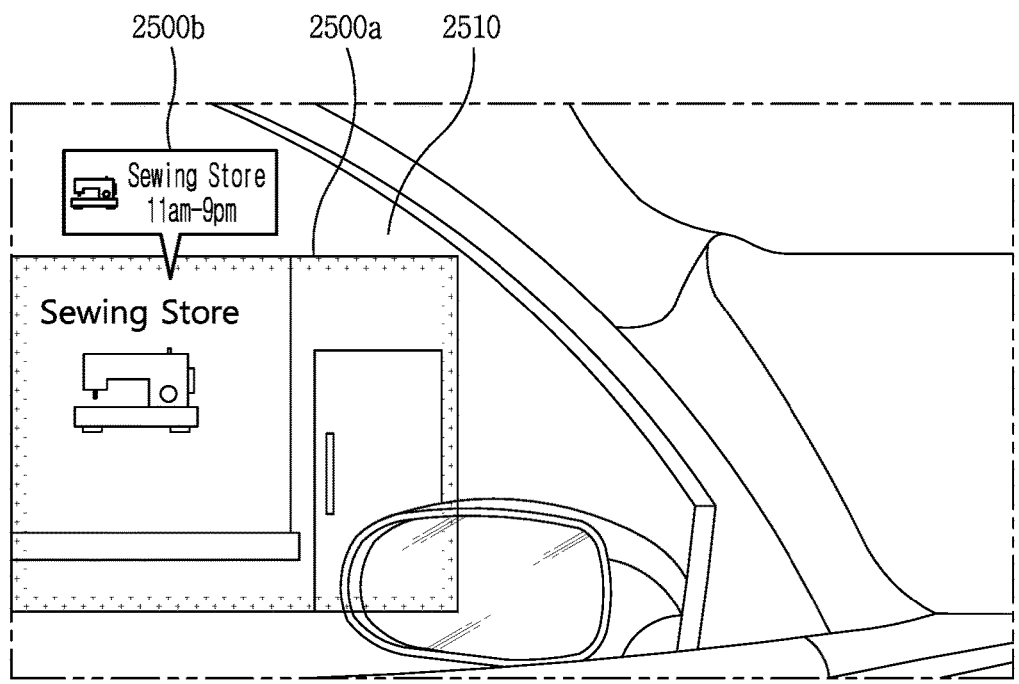

Further, as illustrated in FIG. 24, the processor 870 outputs a graphic object so the graphic object is superimposed on the destination. At this time, when, when the vehicle travels, the driver is identified from a window 2510 that is provided on a lateral surface of the vehicle, the processor 870 outputs a graphic object 2500a so the graphic object 2500a is superimposed on the window 2510.

In addition, the processor 870 outputs information 2500b relating to the destination, together on the window 2510 to which the graphic object is output. That is, the processor 870 outputs the graphic object and at least one piece of information among pieces of information relating to the destination, on the window (or the windshield) through which the driver sees the destination.

Figure 25:
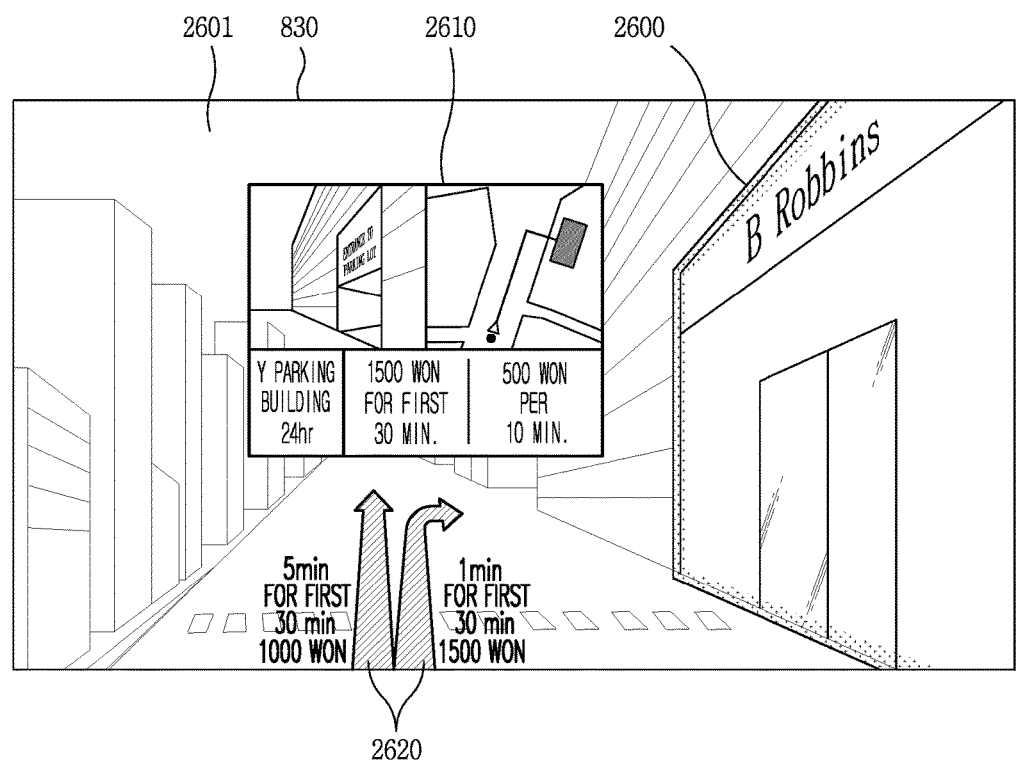

Further, although the destination is not identified through the camera, as illustrated in FIG. 25, the processor 870 outputs an image 2601 that results from image-capturing the destination, to the display unit 830, using an external device (for example, the Internet) or using information from the third party. The image that results from image-capturing the destination is, for example, a road view or a satellite photograph.

When the traveling mode of the vehicle is the manual traveling mode, the display unit 830 here is a CID, a vehicle instrument panel, or a display that is provided in a vehicle seat. In addition, when the traveling mode of the vehicle is the autonomous traveling mode, the display unit 830 is the windshield or the window.

The processor 870 further includes at least one of map information 2610 that guides the vehicle to drive into the parking lot in the building including the destination, information 2620 relating to the parking lot in the building including the destination and information 2620 relating to a nearby parking lot, in the image that results from image-capturing the destination.

In addition, the processor 870 further displays a graphic object 2600 so the graphic object 2600 is superimposed on a portion (or the building including the destination) that corresponds to the destination (or the preset destination) that is set by the user, on the image that results from image-capturing the destination.

According to the embodiments of the present disclosure, there are one or more effects that follow.

Firstly, according to the present disclosure, there are provided a vehicle control apparatus and a vehicle control method that are capable of outputting a graphic object so the graphic object is superimposed on a destination on a windshield and thus of enabling a driver to intuitively recognize the destination when the destination is seen in a driver's field of view.

Secondly, according to the present disclosure, there is provided a new user interface through which an optimized user interface relating to a destination and a parking lot in the destination is output in an AR-HUD way.

Thirdly, according to the present disclosure, there is provided a vehicle control device and a vehicle control method that are capable of intuitively providing information on a path that is formed for possible traveling to a destination, through a windshield, although the destination is not included in a driver's field of view.

Effects according to the present disclosure are not limited to the effects described above, and other effects that are not described above can be understood by a person of ordinary skill in the art from descriptions of claims.

The vehicle control device 800 described above is included in the vehicle 100.

In addition, the method of operating or controlling the vehicle control device 800, described above, applies analogically in the same or similar manner, as a method of operating or controlling the vehicle 100 (or the controller 170).

For example, the method of controlling the vehicle 100 (or the method of controlling the vehicle control device 800) includes a step of receiving an image through a camera, and a step of outputting a graphic object to a display unit so the graphic object is superimposed on a preset destination, based on the preset destination being identified from the image.

The descriptions that are provided above hold true for more specific embodiments, or analogically apply in the same or similar manner to more specific embodiments.

Each of the steps described above may be performed by the controller 170 that is provided in the vehicle 100, as well as the vehicle control device 800.

In addition, all the functions that are performed by the vehicle control device 800, the configurations of the vehicle control device 800, and the methods of controlling the vehicle control device 800 may be performed by the controller 170. That is, all the control methods that are described in the present specification may apply to a method of controlling a vehicle and may apply to a method of controlling a control device.

Furthermore, the vehicle control device 800 that is described in detail above may be the mobile terminal. In this instance, all the functions that are performed by the vehicle control device 800, the configurations of the vehicle control device 800, and the methods of controlling the vehicle control device 800 may be performed by a controller of the mobile terminal. In addition, all the control methods that are described in the present specification analogically apply in the same or similar manner to a method of controlling the mobile terminal.

Specifically, the mobile terminal may be configured to be in the shape of a wearable device (for example, a watch, a sheet of glass, or the like) as well as a smartphone.

In addition, the mobile terminal may make a connection to the vehicle control device through a communication unit to perform communication with the vehicle control device.

The mobile terminal transmits and receives all the types of screen information, the signals relating to the vehicle control, and the user input signal, which are described in the present specification, through the communication unit.

In addition, the mobile terminal receives all the types of screen information, which are described in the present specification, through the communication unit, and outputs all the types of screen information that are received, to a display unit of the mobile terminal. In addition, when a touch (a selection) is performed on the display unit of the mobile terminal, the touched-on (or selected) information is transmitted to the vehicle control device. The vehicle is controlled based on the touch-on information.

In addition, when a gear of the vehicle is shifted or a traveling state of the vehicle is changed, the vehicle control device transmits information relating to the shifting of the gear of the vehicle or the traveling state of the vehicle to the mobile terminal through the communication unit. In this instance, the description that is provided in the specification may apply to screen information relating to the parking, which is output to the mobile terminal.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control device comprising:
   a sensing unit including a camera;
   a display unit; and
   a controller configured to:
   receive a preset destination,
   receive an image captured by the camera,
   identify the preset destination within the image,
   display, on the display unit, a graphic object superimposed on the preset destination;
   display a first graphic object on the display unit including information relating to the preset destination when a building including the preset destination is not identified within the image; and
   display a second graphic object on the display unit corresponding to a peripheral edge of the building when the building including the preset destination is identified within the image.

2. The vehicle control device of claim 1, wherein the display unit includes a windshield and a glass window of a vehicle, and the graphic object is displayed on the windshield or the glass window.

3. The vehicle control device of claim 2, wherein the graphic object is displayed on the windshield or the glass window and overlapping with a driver view of the preset destination by a driver of the vehicle.

4. The vehicle control device of claim 3, wherein the controller is further configured to change a display position and a shape of the graphic object based on the driver view changing according to traveling of the vehicle.

5. The vehicle control device of claim 3, wherein the controller is further configured to display the graphic object superimposed on a building and corresponding to a peripheral edge of the building when the preset destination is located within the building.

6. The vehicle control device of claim 3, where the controller is further configured to display a wall-shaped graphic object superimposed on a parking lot and identifying a border of the parking lot, when the preset destination is the parking lot.

7. The vehicle control device of claim 3, wherein the controller is further configured to display the graphic object in different ways based on whether or not the preset destination is identified from the image and whether or not a building including the preset destination is partially included or fully included within the image.

8. The vehicle control device of claim 1, wherein the controller is further configured to display a third graphic object superimposed on a portion of the building when only a portion of the building including the preset destination is including in the image.

9. The vehicle control device of claim 1, wherein the controller is further configured to display a parking graphic object on the display unit relating to a parking lot that corresponds to the preset destination.

10. The vehicle control device of claim 9, wherein the controller is further configured to display the parking graphic object in a first predetermined manner when a distance between a building including the preset destination and the vehicle control device is within a first predetermined distance, and display the parking graphic object in a second predetermined manner when the distance between the building and the vehicle control device is within a second predetermined distance that is less than the first distance.

11. The vehicle control device of claim 10, wherein the controller is further configured to identify an entrance to the parking lot from the image and display a parking lot entrance graphic object superimposed on the entrance.

12. The vehicle control device of claim 9, wherein the controller is further configured to:
   in response to the vehicle control device traveling within a fixed distance from the preset destination, display a first graphic object corresponding to a parking lot within a building including the preset destination and display a second graphic object corresponding to another parking lot that is located within a fixed distance from the parking lot within the building, and
   wherein the first graphic object and the second graphic object are superimposed on a driver view of a road by a driver of a vehicle.

13. The vehicle control device of claim 9, wherein the controller is further configured to display the parking graphic object with a first color and superimposed on a building including the preset destination when the parking lot is full and display the parking graphic object with a second color and superimposed on the building including the preset destination when the parking lot has available parking spaces.

14. The vehicle control device of claim 1, wherein the controller is further configured to change a shape of the graphic object based on a current traveling speed of a vehicle including the vehicle control device.

15. The vehicle control device of claim 1, wherein the controller is further configured to identify an available parking space along a road and display a parking graphic object superimposed on the available parking space and overlapping with a driver view of the available parking space by a driver of a vehicle including the vehicle control device.

16. The vehicle control device of claim 1, wherein the controller is further configured to:
in response to a vehicle approaching an intersection of a first road and a second road when the preset destination is not identified from the image, display first time information for reaching the preset destination using the first road and second time information for reaching the preset destination using the second road, and
wherein the first time information is superimposed and overlapping with a driver view of the first road by a driver of a vehicle and the second time information is superimposed and overlapping with a driver view of the second road by the driver of the vehicle.

17. The vehicle control device of claim 1, wherein the controller is further configured to:
display a plurality of graphic objects respectively corresponding to a plurality of destinations belonging to a same category as the preset destination when the preset destination is identified from the image, and
in response to receiving a selection of one of the plurality of graphic objects, display the one of the plurality of graphic objects superimposed on and overlapping with a driver view of a destination corresponding to the one of the plurality of graphic objects.

18. A vehicle comprising the vehicle control device according to claim 1.

19. A vehicle control method comprising:
receiving a preset destination;
receiving an image captured by a camera;
identifying the preset destination within the image;
displaying, on a display unit, a graphic object superimposed on the preset destination and overlapping with a driver view of the preset destination by a driver of a vehicle;
displaying a first graphic object on the display unit including information relating to the preset destination when a building including the preset destination is not identified within the image; and
displaying a second graphic object on the display unit corresponding to a peripheral edge of the building when the building including the preset destination is identified within the image.

* * * * *